ㅤㅤㅤㅤㅤㅤㅤㅤㅤㅤㅤㅤㅤUS005426510A

United States Patent [19]
Meredith

[11] Patent Number: 5,426,510
[45] Date of Patent: Jun. 20, 1995

[54] AUDIO-VIDEO SYSTEM

[75] Inventor: Anthony R. Meredith, Lansing, Mich.

[73] Assignee: Dolman Associates, Inc., Lansing, Mich.

[21] Appl. No.: 894,407

[22] Filed: Jun. 5, 1992

[51] Int. Cl.$^6$ .................. H04N 5/76; H04N 7/18
[52] U.S. Cl. .................... 358/335; 348/159;
ㅤㅤㅤㅤㅤㅤㅤㅤㅤㅤ348/61; 358/34; 360/33.1
[58] Field of Search ............... 358/93, 108, 181, 342,
ㅤ358/341, 343, 311; 360/5, 33.1, 14.1, 137, 35.1;
ㅤㅤㅤㅤH04N 5/76, 9/79, 5/91, 5/262, 5/278, 7/18;
ㅤㅤㅤㅤㅤㅤㅤㅤㅤㅤㅤㅤㅤㅤㅤ348/159, 61

[56]ㅤㅤㅤㅤㅤReferences Cited

U.S. PATENT DOCUMENTS

| | | | |
|---|---|---|---|
| 2,149,637 | 3/1939 | Smith | 179/1 |
| 2,638,980 | 5/1953 | Dolph | 161/17 |
| 3,115,548 | 12/1963 | Stowell | 179/1 |
| 3,694,578 | 9/1972 | Reid | 179/1 |
| 3,730,995 | 5/1973 | Mathews | 179/1 |
| 4,035,589 | 7/1977 | Parke | 179/100.1 |
| 4,090,032 | 5/1978 | Schrader | 179/1 |
| 4,184,048 | 1/1980 | Alcaide | 179/1 |
| 4,232,190 | 11/1980 | Laiacona | 179/1 |
| 4,311,874 | 1/1982 | Wallace, Jr. | 179/1 |
| 4,449,238 | 5/1984 | Lee et al. | 381/110 |
| 4,489,442 | 12/1984 | Anderson et al. | 381/81 |
| 4,498,107 | 2/1985 | Yoshimaru et al. | 358/903 |
| 4,525,820 | 6/1985 | Enoki et al. | 369/2 |
| 4,577,344 | 3/1986 | Warren et al. | 358/108 |
| 4,598,418 | 7/1986 | Griffith, Jr. et al. | 381/83 |
| 4,658,425 | 4/1987 | Julstrom | 381/81 |
| 4,658,427 | 4/1987 | Aubin | 381/124 |
| 4,814,869 | 3/1989 | Oliver, Jr. | 358/108 |
| 4,837,829 | 6/1989 | Lobb | 381/83 |
| 4,881,135 | 11/1989 | Heilweil | 358/335 |
| 4,931,950 | 6/1990 | Isle et al. | 364/513 |
| 4,937,408 | 6/1990 | Hattori et al. | 200/314 |
| 4,965,819 | 10/1990 | Kannes | 358/183 |
| 4,989,253 | 1/1991 | Liang et al. | 381/110 |
| 5,031,872 | 7/1991 | Vance et al. | 381/169 |
| 5,034,808 | 7/1991 | Murray | 358/86 |
| 5,060,273 | 10/1991 | Olah et al. | 381/119 |
| 5,159,258 | 10/1992 | Kolvites et al. | 320/14 |
| 5,194,722 | 3/1993 | Mergenthaler et al. | 235/463 |
| 5,199,770 | 4/1993 | Yoshino et al. | 303/92 |

FOREIGN PATENT DOCUMENTS 0449273 10/1991 European Pat. Off. ........ H04N 5/76

OTHER PUBLICATIONS

Stenograph Legal Services, Inc.; Have you been dreaming about little voices; 1 page.
Jefferson Audio Video Systems, Inc.; JAVS; 30 pages.

Primary Examiner—Howard W. Britton
Assistant Examiner—Thai Tran
Attorney, Agent, or Firm—Dykema Gossett

[57]ㅤㅤㅤㅤABSTRACT

A judicial audio-video system 10 is disclosed for use in a typical courtroom 12. System 10 includes several cameras 28, 30, 32, 34, and 36 and several microphones 40, 42, 44, 46, 48, 50, 52, and 54 which are deployed within the courtroom 12. System 10 further includes a control system 38 having several video cassette recorders 118, 120, 122, 124, 126, adapted to record various events occurring within courtroom 12. System 10 further includes a local controller 60 which is adapted to allow a judge, or other court official, to easily control the manner in which the events are recorded.

6 Claims, 18 Drawing Sheets

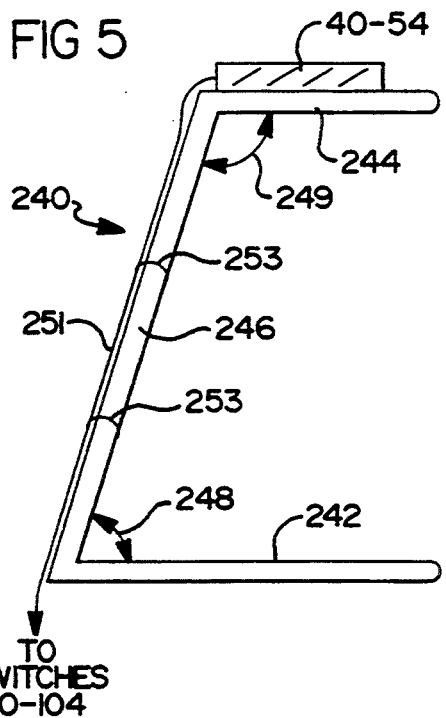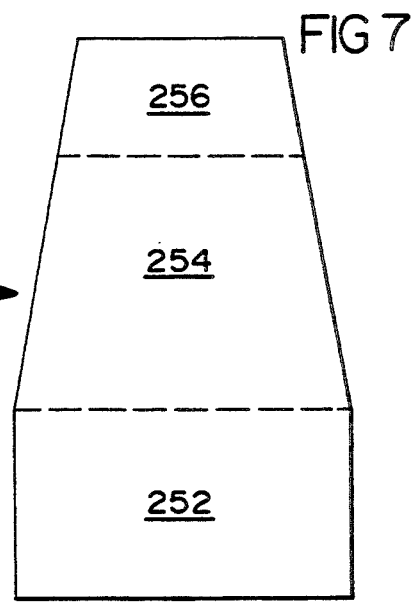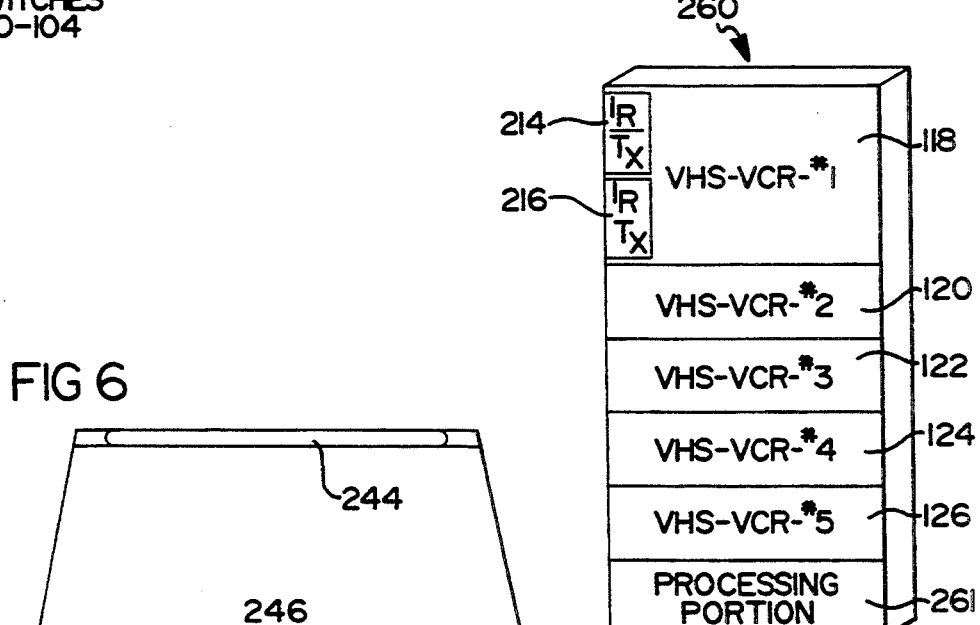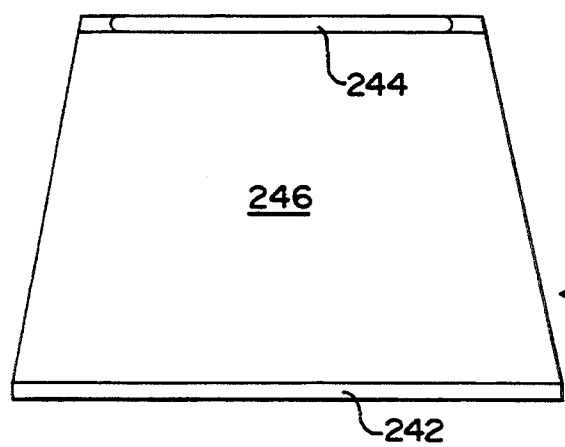

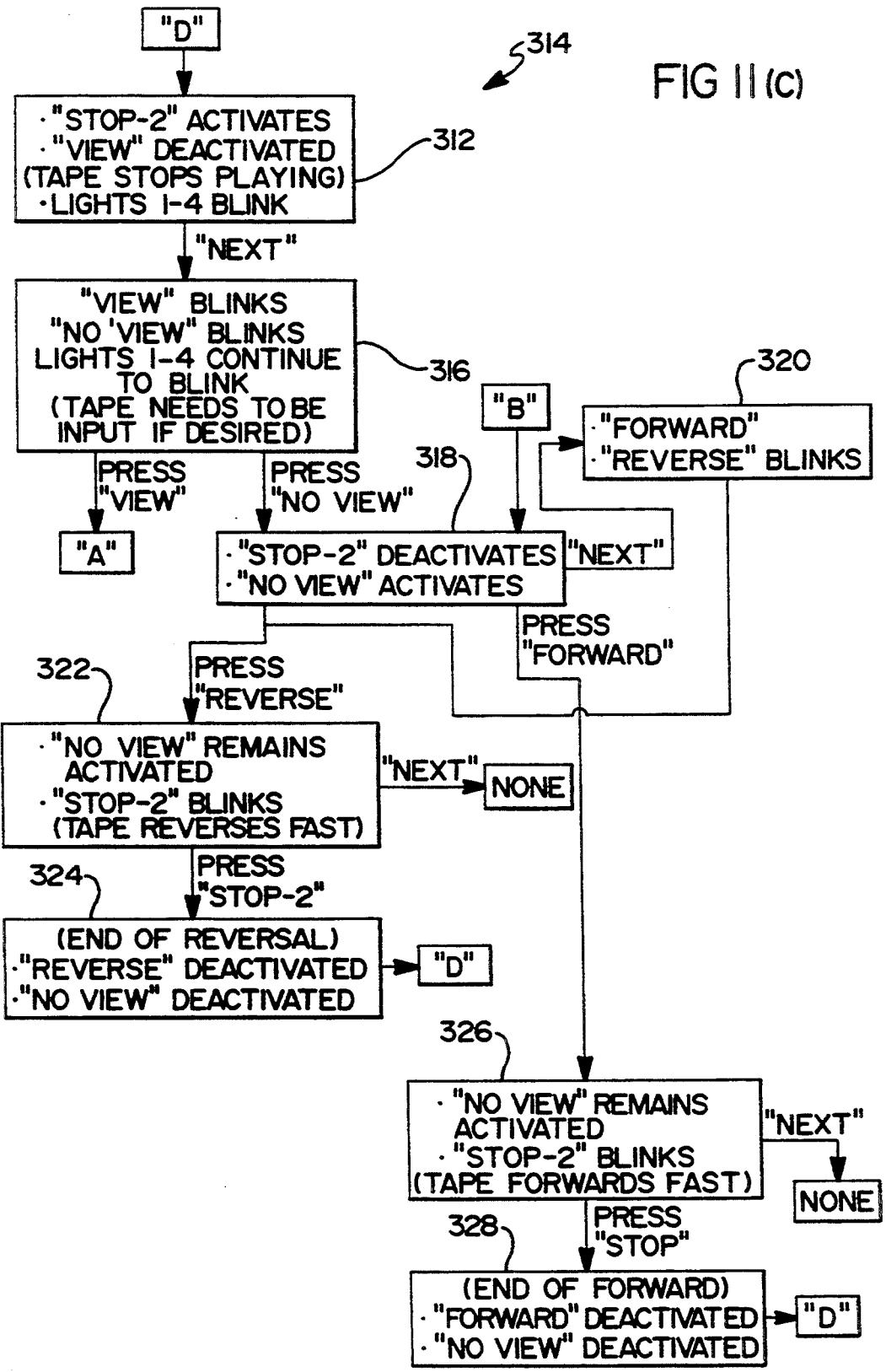

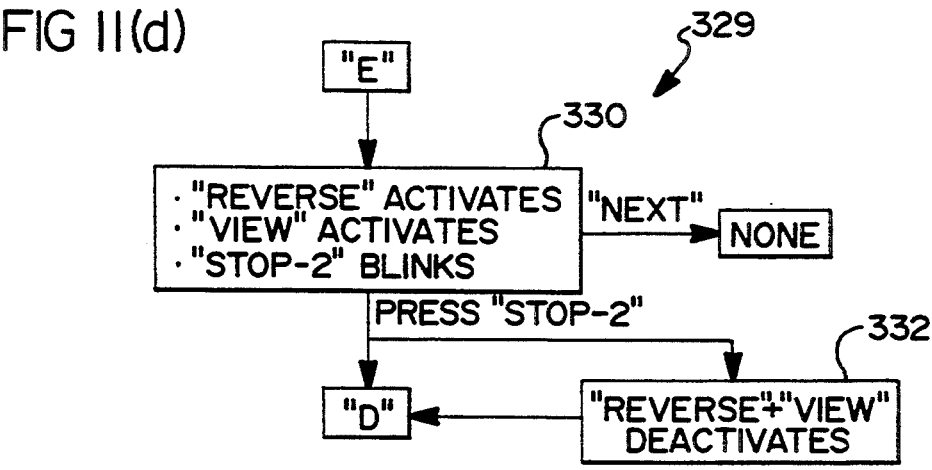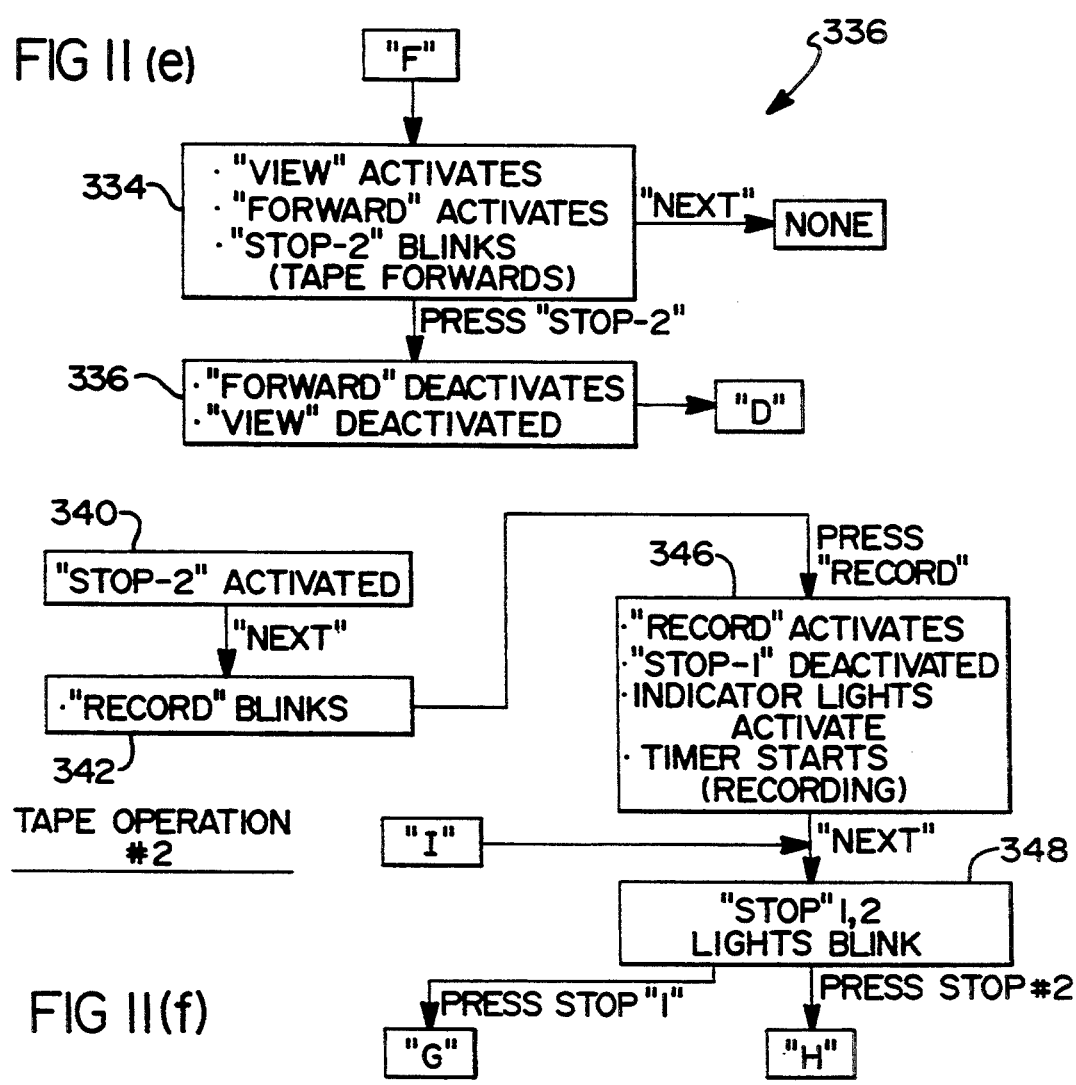

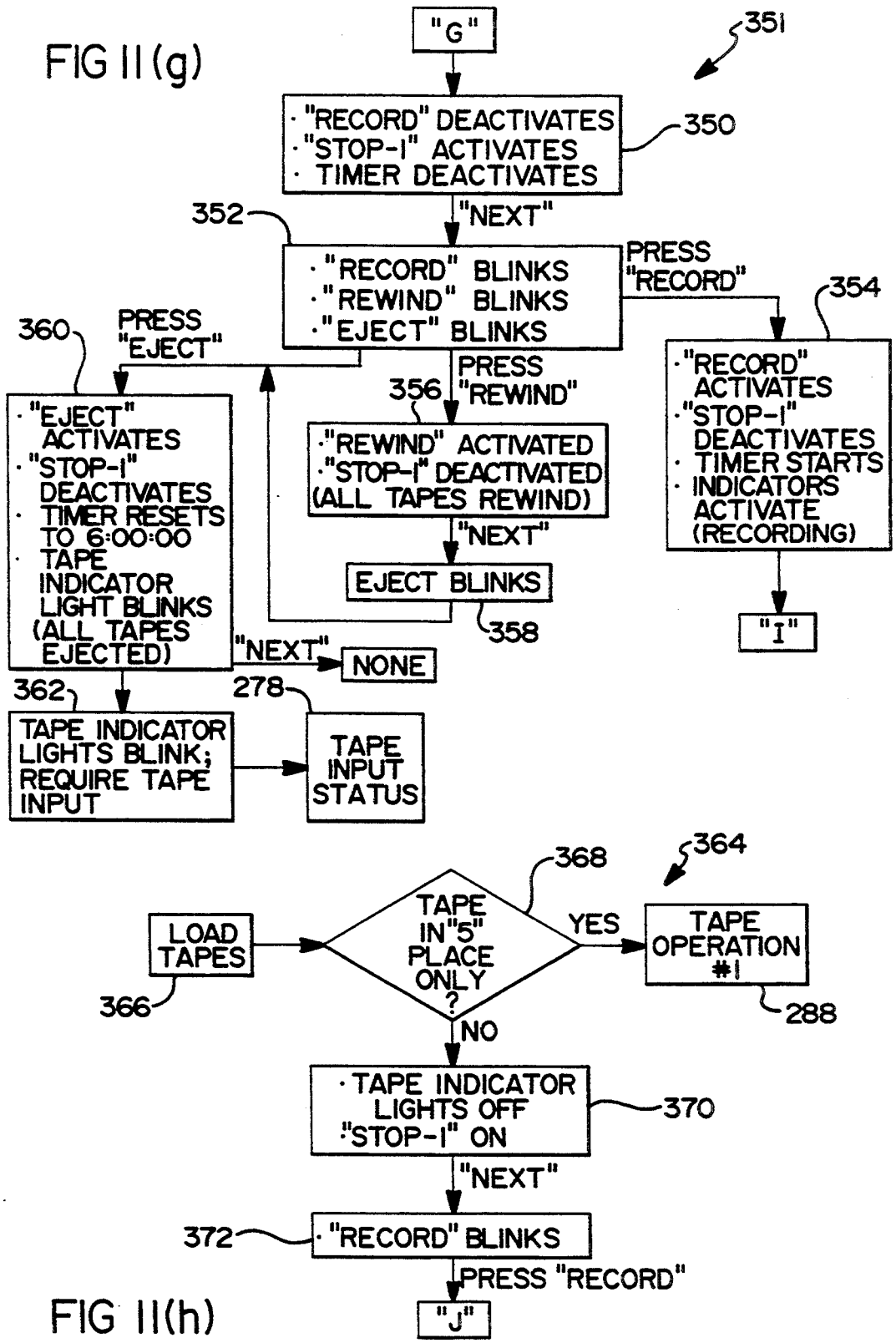

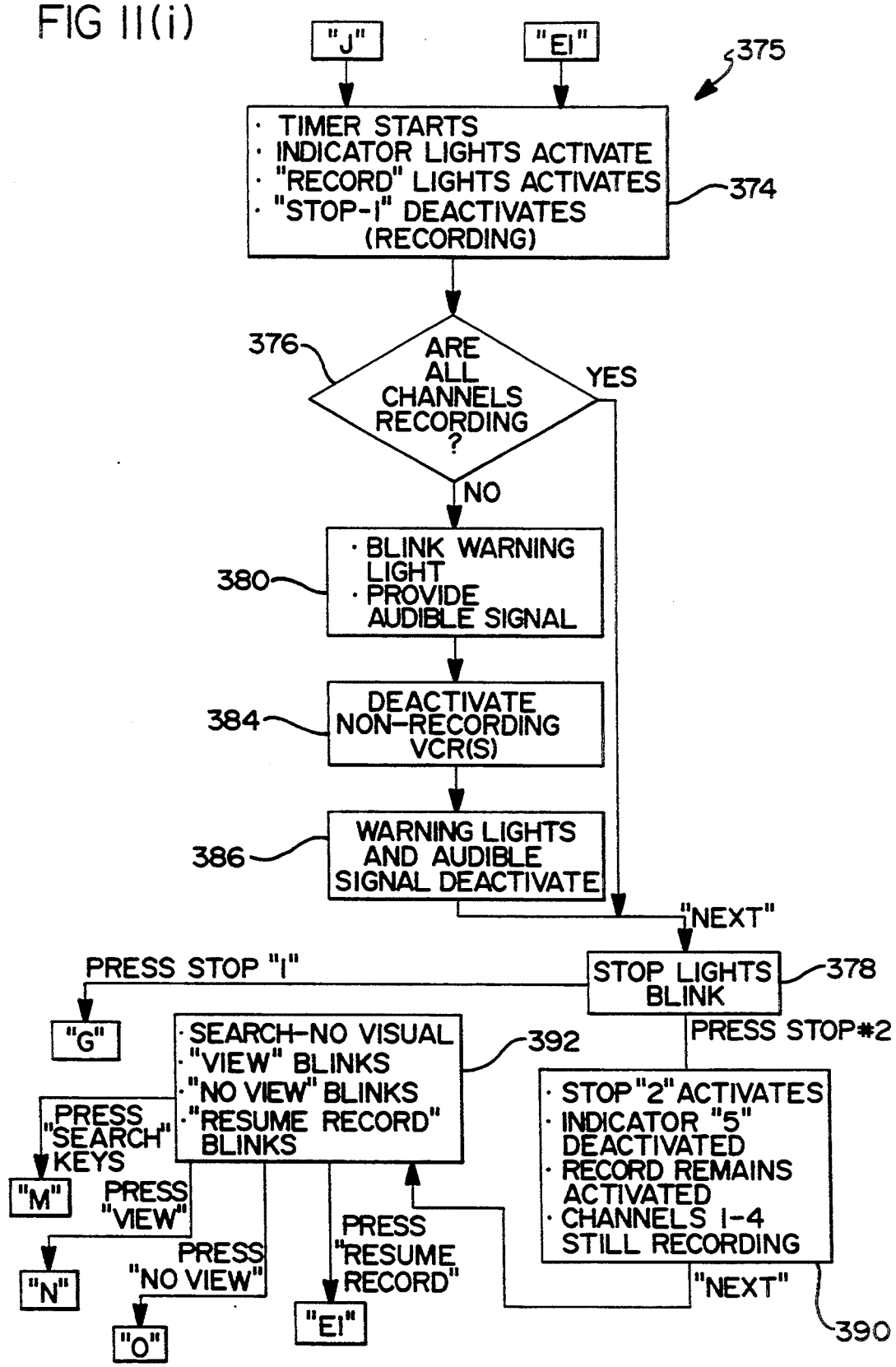

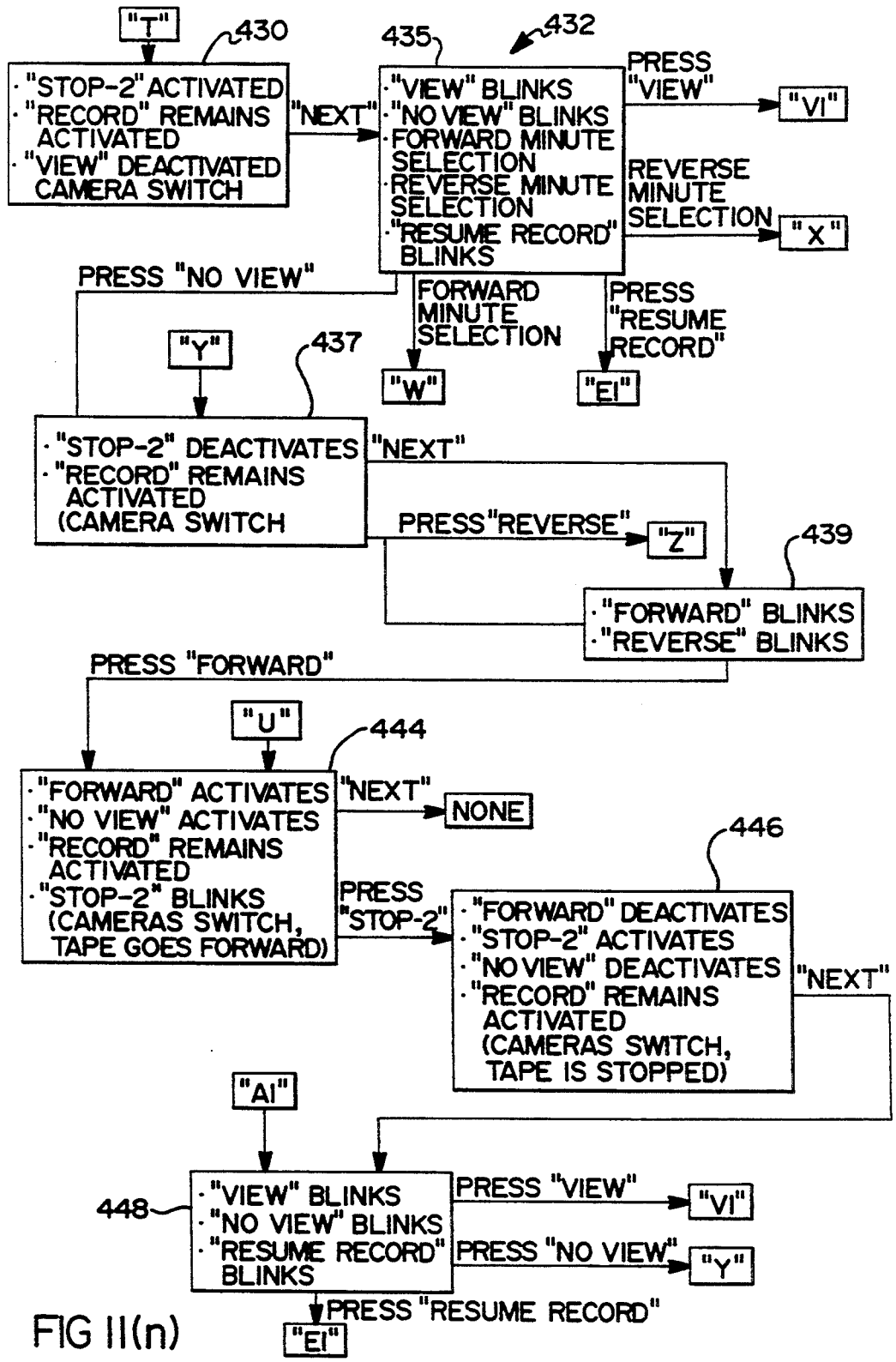
FIG II(n)

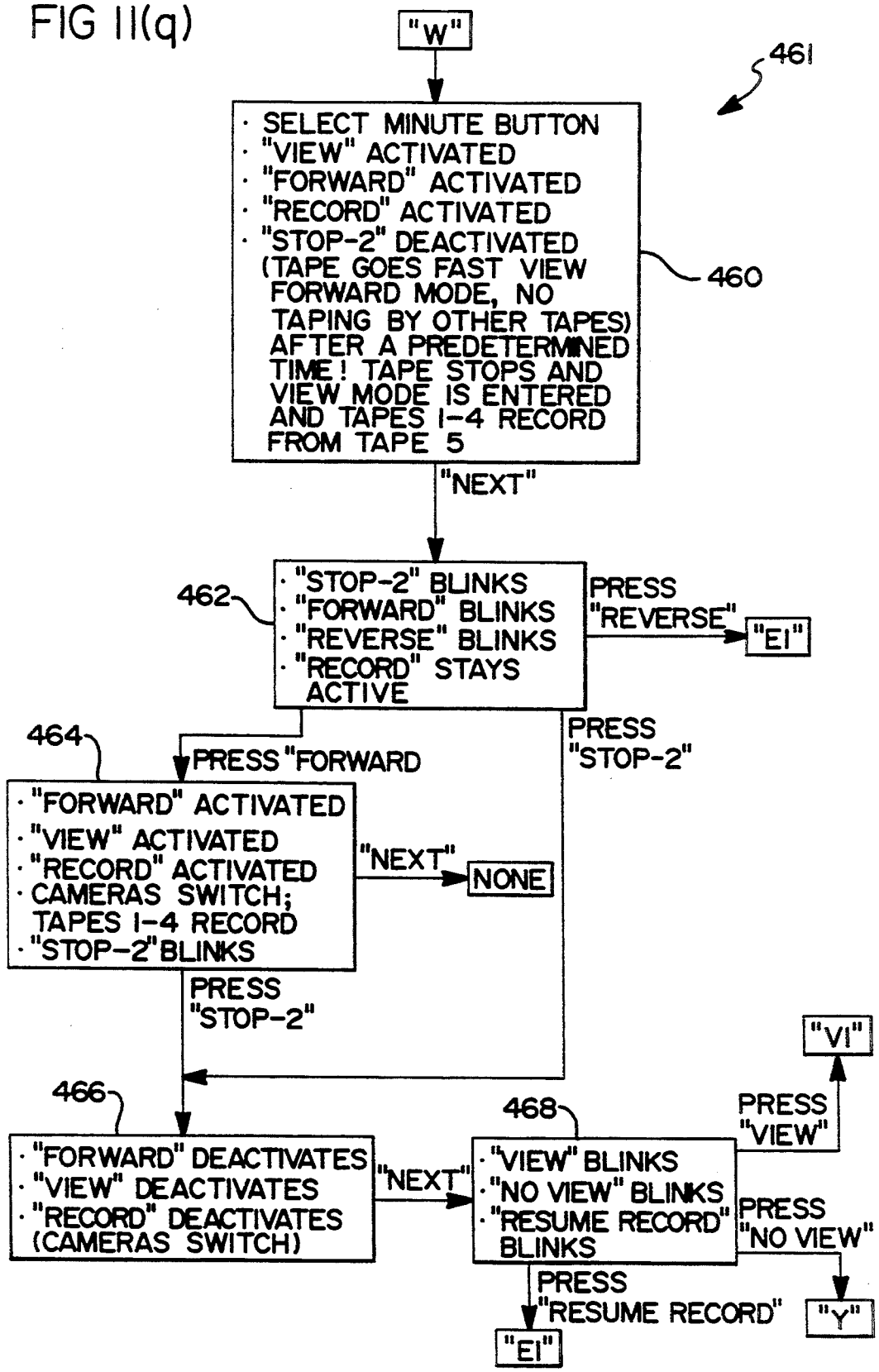

AUDIO-VIDEO SYSTEM

BACKGROUND OF THE INVENTION

1. Field of the Invention

This invention relates to an audio-video system and, more particularly, to an audio-video system for use in a courtroom and in other areas in which many events occur.

2. Discussion

Audio-video systems are used in a wide variety of applications and are adapted to record the images and audio signals associated with various events. These recorded images and audio signals are often used for archival and/or educational purposes. More particularly, such systems have gained acceptance by obviating the need for teachers or transcribers, thereby reducing cost.

While prior audio-video systems have been widely used in educational and medical environments, (i.e. "one speaker at a time" environments) they have not been widely employed in a courtroom or other adversarial environment, even though they obviate the need for court reporters, thereby reducing costs. That is, though courtroom or adversarial type proceedings seem to be a natural setting or application for the use of these prior audio-video systems, such proceedings have many unique characteristics and stringent recording requirements that make many of these prior systems impractical. For example, unlike a "one speaker at a time" environment, an adversarial proceeding is normally characterized by the generation of audio signals from a variety of sources, such as judges, juries, attorneys, court employees, and from visitors. These diverse audio requirements require an audio-video system to process a great number and variety of often conflicting and competing audio signals, while ensuring that the system capture all of the video image material necessary to fully and accurately record the great number of events occurring during this type of proceeding.

These requirements are particularly troublesome to many of these prior systems, since these systems are designated to uniquely associate one or more cameras with certain microphones. When multiple audio signals are simultaneously and competingly generated, these systems usually activate cameras associated with each active microphone for a small amount of time. Such camera switching causes these systems to fail to completely record all of the necessary events. Additionally, the audio video recordings associated with judicial proceedings must be of an extremely high quality, in order to ensure that the recordings, which have legal significance, properly and accurately reflect the actions associated with the proceedings. Many of these prior systems provide video recordings of poor and unacceptable quality.

Moreover, many of these prior audio-video systems are very complicated and difficult to use. In the judicial context, this difficulty is magnified and often times becomes the single impediment to the use of an otherwise technically sound system. That is, due the very complex and fast moving nature of judicial and adversarial proceedings, a judge, or other court officer, has very little time to reflect upon the wide variety of operational aspects that are associated with such an audio-video system. Moreover, the budget constraints confronted by the judiciary prevents one or more individuals from being solely assigned to operate such an audio-video system. Therefore, in order to ensure that such a audio-video system will gain wide acceptance by judges and other judiciary officers, it is essential that a judicial audio-video system be very easy to use and provide prompts that enable an operator to quickly and easily ascertain certain operations which may be performed at any given time.

Many times during an adversarial proceeding, it is necessary for a judge or a party to review events (i.e. such as witnesses testimony) that may have just previously occurred. In this regard, a judicial audio-visual system must also be capable of accurately and easily presenting prior recorded events to a judge or other proceeding attendees, in an efficient and easily selectable manner. Many of these prior audio-video systems, while accurately recording many types of proceedings, have not allowed the recordings to be selectively interrupted in order to allow those in attendance to quickly and easily review those events which have just occurred.

Moreover, many of these prior audio-video systems have also been prone to failure and have not adequately allowed a user to diagnose or ascertain those parts of the system which have failed or become faulty. In this regard, many of these systems have experienced relatively long times of inactivity or failure, due to the inability of a user to determine the steps necessary to correct the fault. This is particularly important in the heavily loaded judicial context. Therefore, a judicial audio-video system must be highly reliable and must be easily repaired and adapted to provide signals effective to identify those portions of the system which are faulty or in error. In this manner, the heavily judicial workload will not be unduly and adversely impacted.

There is therefore a need to provide an audio-video system which may be reliably used and which meets the diverse needs of a judicial or adversarial proceeding or environment. Such an audio-video system should be capable of accurately recording the multitude of events which take place within a adversarial proceeding and should be capable of receiving and processing multiple and often conflicting types of audio signals, and selecting only those video images which are needed to accurately record the events occurring within a courtroom. Moreover, the provided judicial audio-video system should be relatively easy to use and should provide indication signals, effective to identify system faults, thereby allowing a user to easily and quickly correct system difficulties.

SUMMARY OF THE INVENTION

A first object of this invention is to provide an audio-video system for use in a courtroom or other judicial or adversarial setting.

It is another object of this invention to provide an audio-video system which is relatively easy to use and which is adapted for use in a setting in which many types of diverse events occur, requiring the reception and processing of many different types of audio and video signals.

It is a further object of this invention to provide an audio-video system which is relatively easy to use and which provides at least one fault signal, indicative of the operational integrity of tile system. Such a signal is effective to allow a system user to quickly and easily ascertain system faults.

According to the teachings of the present invention, an audio-video system is provided for use within a courtroom or other adversarial area. The system includes several cameras adapted to provide visual images associated with the various events occurring within the proceeding area. The system further includes several microphones, adapted to produce electrical signals representative of the audio signals associated with events occurring within the area, and several recorders adapted to selectively record the signals emanating from the cameras and microphones. The system of the preferred embodiment of this invention also includes a control system means, coupled to the microphone and to the camera means and under stored program control, for providing a sequence of blinking lighted depressible switches associated with unique operational commands and for only executing those operational commands that are associated with depressed switches that have been blinking.

Further objects, features and advantages of the invention will become apparent from a consideration of the following description and from a consideration of the appended claims when taken in conjunction with the accompanying drawings.

BRIEF DESCRIPTION OF THE DRAWINGS

Various advantages of the present invention will become apparent to those skilled in the art by reading the specification and by reference to the following drawings in which:

FIG. 5 is a side view of a microphone stand made in accordance with the teachings of the preferred embodiment of this invention;

FIG. 6 is a front view of the microphone stand shown in FIG. 5;

FIG. 7 is a view of the microphone stand shown in an unassembled state;

FIG. 8 is a partial perspective view of a cabinet adapted to contain the control system shown in FIG. 2;

DETAILED DESCRIPTION OF THE INVENTION

Figure 1:
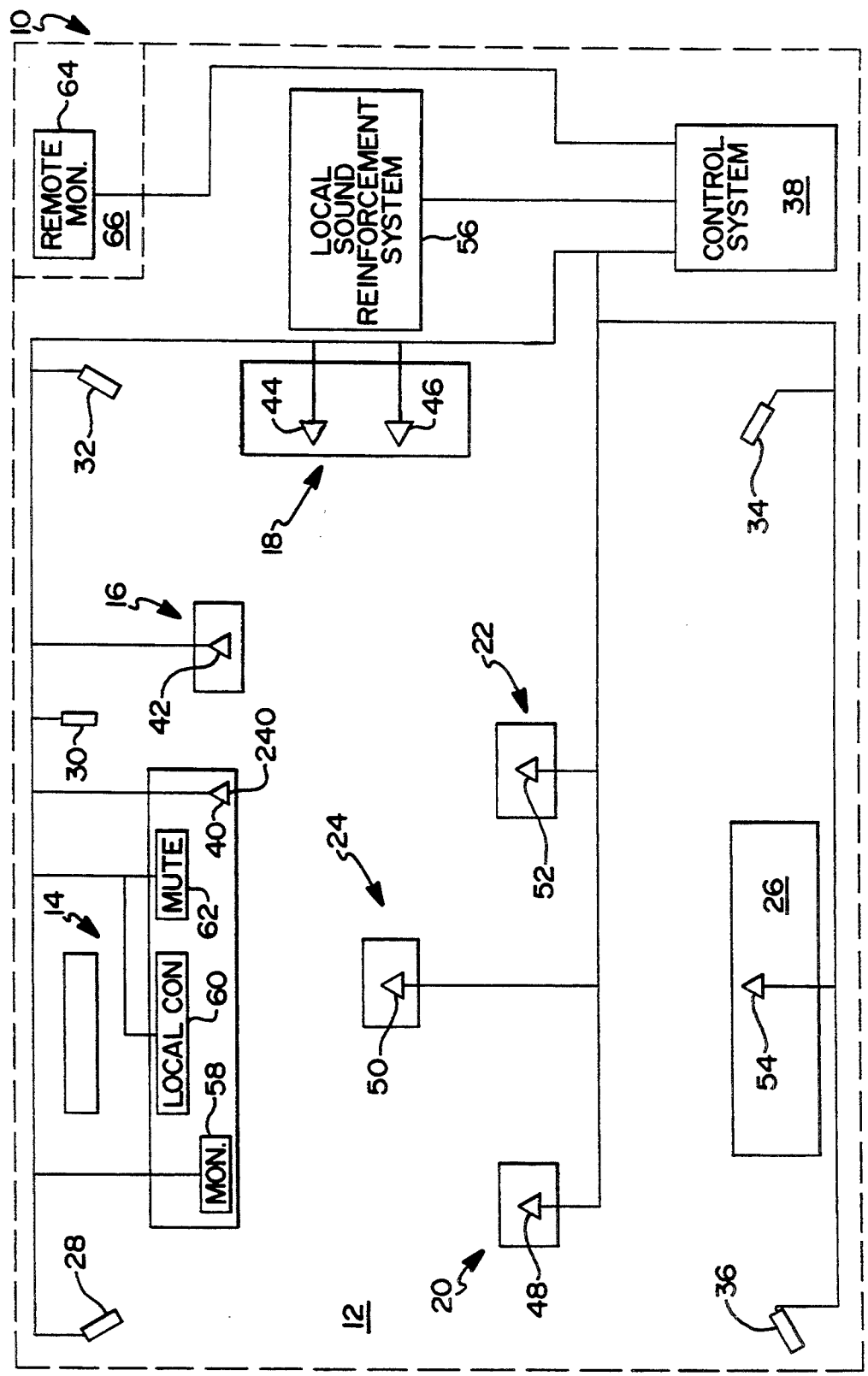
FIG. 1 is a block diagram of the audio-video system of the preferred embodiment of this invention, deployed within a typical courtroom or adversarial area.

Referring now to FIG. 1, there is shown an audio-video system 10 made in accordance with the teachings of the preferred embodiment of this invention and deployed within a typical courtroom or adversarial proceeding area 12. As shown, area 12 normally includes a judge's bench area 14; a witness stand 16; a jury box 18; a plaintiff's desk or station 20; a defendant's desk or station 22; a presentation podium 24; and a visitors viewing gallery 26. According to the teachings of a preferred embodiment of this invention, cameras 28, 30, 32, 34, and 36 are normally deployed around area 12, effective to allow the cameras 28–36 to cooperatively record any event that may occur within any portion of courtroom 12. Moreover, in the preferred embodiment of this invention each of the cameras 28, 30, 32, 34, and 36 comprise a Sony model SSC-C374 CCD color video camera and include one of four lenses appropriate for its given and unique location. These lens choices are as follows:

(A) Panasonic model MN-815 which includes a 6 millimeter lens with a manual iris, a manual focus, and no zoom capabilities;

(B) A Panasonic model MN-518 which includes a 15 millimeter lens with a manual iris, a manual focus, and no zoom capabilities;

(C) A Vicon model V8.5–51 which includes a lens which is selectable from 8.5 to 51 millimeters and which further has a manual focus, a manual iris, and a manual zoom capability; and (D) A Sony model VCL-S06XEA which includes a 6 millimeter lens having a manual focus and an automatic iris capability.

It should be apparent to one of ordinary skill in the art, these various lenses are appropriately chosen and are dependent upon the environmental characteristics associated with courtroom 12 and upon the specific location that these individual cameras 28, 30, 32, 34, and 36 must "cover" or record.

As further shown in FIG. 1, audio-video system 10 includes a control system 38 which is operationally coupled to each of the cameras 28, 30, 32, 34, and 36 and which is further operationally and coupled to microphones 40, 42, 44, 46, 48, 50, 52, and 54. As will be described, control system 38 is adapted to cause one of the cameras 28, 30, 32, 34, or 36 to be recordingly activated upon receipt of an output signal from the one of the microphones 40, 42, 44, 46, 48, 50, or 52, each of which is supported upon a stand 240, to be later described. Moreover, system 10 further includes a local sound reinforcement system 56, which, as will be explained, is effective to cause the output signals from the microphones 40–52 to be selectively radiated within courtroom 12.

Referring again to FIG. 1, it is seen that system 10 further includes a monitor 58, which is coupled to control system 38 and which is adapted to allow a judge to view the events that are being recorded within courtroom 12 and, as will be explained, to selectively view events that have been previously recorded. Normally deployed within judges station 14, is a local controller 60 and a mute device 62. Both local controller and mute device 62 are coupled to control system 38 and respectively allow a judge to control the recording operations which are occurring within courtroom 12 and to selectively disable or "mute" various microphones 40–52 and cameras 28–36. System 10 further includes a remote monitor 64, which is coupled to control system 38 and which is normally deployed within a judges chamber or remote location 66, and which, as will be explained, is adapted to allow an individual to remotely view the various events that are being recorded within courtroom 12. In the preferred embodiment of this invention, monitors 58 and 64 each comprise a Sony model KV-13TR24 video monitor.

Figure 2:
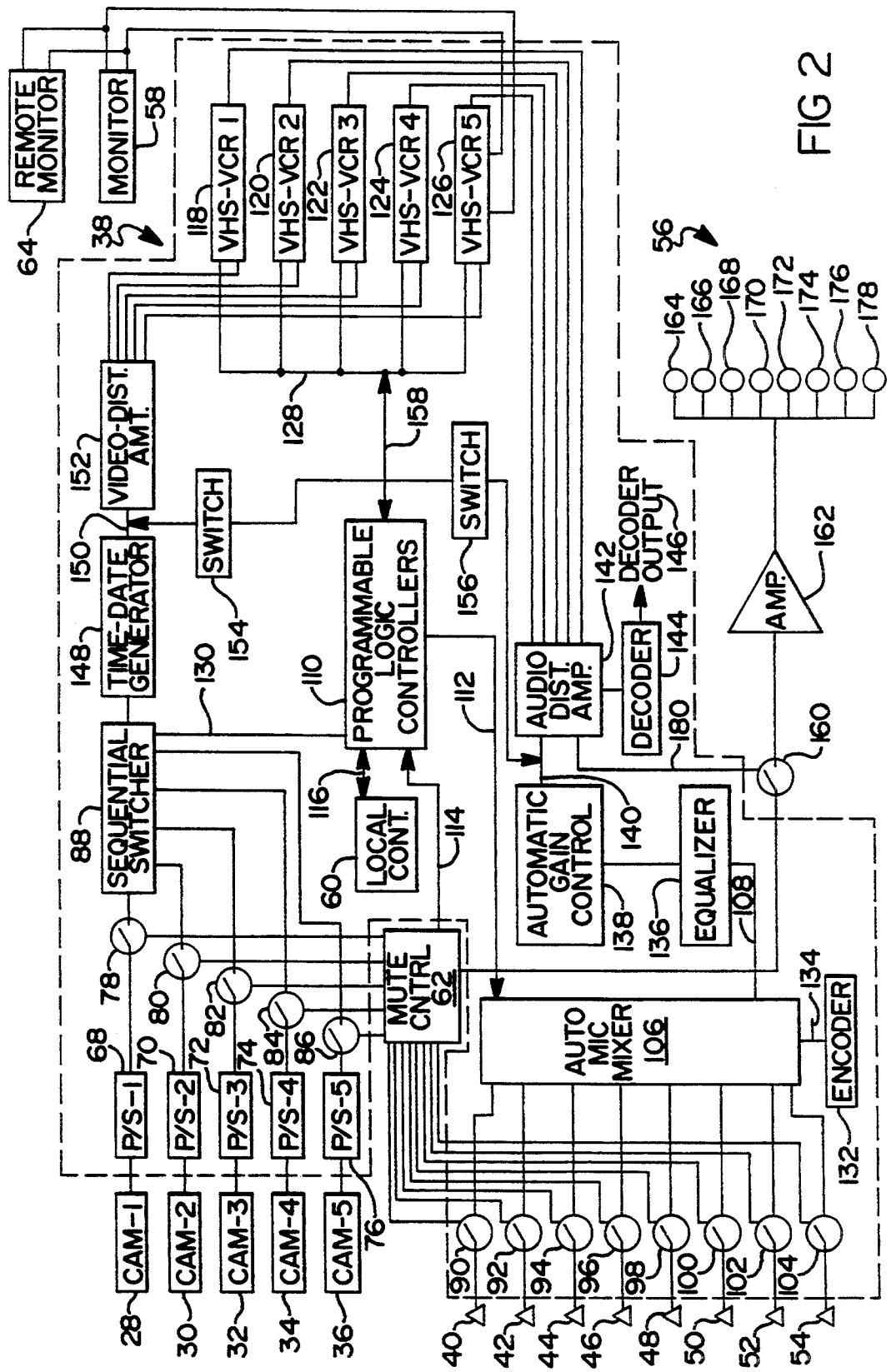
FIG. 2 is an electrical schematic diagram of the audio-video system shown in FIG. 1.

Referring now to FIG. 2, a further description of the operation of control system 38 will ensue. As shown, system 38 includes power supplies 68, 70, 72, 74, and 76 which are respectively and uniquely coupled to cameras 28, 30, 32, 34, and 36. As will be appreciated by one of ordinary skill in the art, these power supplies 68-76 provide electrical power to each of the cameras 28-36 in order to allow these cameras to operate in the manner intended. It should further be appreciated by one of ordinary skill in the art that power supplies 68-76 may be obviated if the selected cameras 28-36 include an internal power supply.

Moreover, system 38 further includes switches 78, 80, 82, 84, and 86 which have an output coupled to a unique one of tile power supplies 68, 70, 72, 74, and 76 and which have an input coupled to mute controller 62. Moreover, each of the switches 78-86 further have an input coupled to a sequential switcher 88, which in the preferred embodiment of this invention comprises a Panasonic model WJ-523, configured in a typical and known "spot mode". As will be appreciated by one of ordinary skill in the art, mute control 62, configured in the manner shown in FIG. 2, is effective to selectively disconnect or disable one or more of the outputs of cameras 28-36 from switcher 88. In this manner, a judge may selectively lock a single camera 28-36 into the "record mode" in which only images emanating from the selected camera are input to switcher 88. In this manner, the selected camera will provide video image recording information to system 38 while the other unselected cameras are inhibited from providing any such recording image signals.

As further shown in FIG. 2, system 38 further includes switches 90, 92, 94, 96, 98, 100, 102, and 104, each of which, in the preferred embodiment of this invention, is substantially identical to switches 78-86. Moreover, as further shown, each of the switches 90-104 has an output coupled to a unique one of the microphones 40-54 (each comprising a model PCC-160, manufactured by the Crown Company) and an input coupled to a typical automatic microphone mixer 106, which in the preferred embodiment of this invention comprises a combination of a "main frame" model DJ-4100 including a power supply and rack mounting housing; two model DJ-4114 of "voice-matic" microphone mixers; and a model DJ-4115 master mixer, all of which are manufactured by the IRP Company of Elk Grove Village, Ill. It should be apparent to one of ordinary skill in the art, that when switches 92-104 are in a contact position, audio output signals from microphones 40-52 are input to mixer 106 and are conventionally mixed. The mixed signal is then output onto bus 108.

It should further be apparent to one of ordinary skill in the art that mixer 106 is effective to compare each of the received audio output signals from microphones 40-54 with a threshold noise level, and to provide an indication of the level of audio signals appearing on the output of each of these microphones 40-54. Moreover, each of the switches 90-104 has a further input coupled to mute controller 62. As should be apparent to one of ordinary skill in the art, mute controller 62 is effective to cause switches 90-104 to selectively prevent one or more of the audio signals associated with each of the microphones 40-54 from being receivably input to mixer 106. In this manner, microphones 40-54 may be selectively muted or inhibited from outputting an audio signal to system 38. Moreover, as should further be apparent to one of ordinary skill in the art, mute controller 62 is further adapted to selectively lock a single microphone 40-54 into mixer 106. In this manner, system 38 records only the audio signal emanating from the locked microphone 40-54, while the other unselected microphones are be inhibited.

As further shown in FIG. 2, system 38 includes a programmable logic controller assembly 110, which in the preferred embodiment of this invention comprises a series of Idec model micro-1 microprogrammable controllers, each operating under stored program control. These controllers, as further shown, are coupled to mixer 106 by means of bus 112; are coupled to mute controller 62 by means of bus 114; are coupled to local controller 60 by means of bus 116; and are coupled to typical video cassette recorders 118, 120, 122, 124, and 126 by means of bus 128. Additionally, logic controller assembly 110 is further coupled to sequential switcher 88 by means of bus 130. In this manner, and as should be apparent to one of ordinary skill in the art, switches 78-86 and 90-104 may be obviated and the aforedescribed selective isolation selection of cameras 28-36 and microphones 40-54 may be achieved by signals, generated by logic controller assembly 110, and appearing on buses 112 and 130.

More particularly, programmable logic controller assembly 110 may selectively signal sequential switcher 88, by means of signals appearing on bus 130, to allow only certain of the cameras 20-36 to be switched into the "spot mode", thereby "locking out" or preventing the output of certain cameras from reaching switches 88. Alternatively, the signals appearing on bus 130 may also signal sequential switcher 88 to allow only a single one of the cameras 28-36 to have its uniquely associated image output signal being received by system 38. Moreover, as should be further apparent to one of ordinary skill in the art, programable logic controller assembly 110 may also apply certain signals onto bus 112 which will cause microphone mixer 106 to selectively prevent one or more of the microphones 40-54 from having their uniquely associated audio output signal being mixed and output onto bus 108. Alternatively, the signals appearing on bus 112 may cause mixer 106 to select a certain one of the microphones 40-54 in a manner effective to allow only the selected microphone audio signal output to be applied onto bus 108. The use of buses 112 and 130 in combination with programmable logic controller assembly 110 therefore further adds to the overall integrity of system 38 by obviating the need for switches 78-86 and switches 90-104, which are often prone to failure.

It should also be realized by one of ordinary skill in the art that in operation, programmable logic controller assembly 110 determines which of the microphone outputs are "active" or are sensing event audio information. Accordingly, each microphone 40-52 is uniquely associated with one of the cameras 28-36. When one of the outputs from microphones 40-52 is sensed as active, the uniquely associated camera is allowed to couple its image signals into switches 88, and the other cameras 28-36 are prevented from inputting image data. In his manner, audio and video signals of each of the events occurring within area 12 are properly recorded. Moreover, as should further be apparent to one of ordinary skill in the art, assembly 110 makes this camera selection determination by use of bus 112 and the typical microphone indication output signals associated with mixer 106.

In order to prevent unnecessary camera switching and associated poor event reproduction that characterize prior systems, caused by the generation of audio signals from multiple sources, system 10 operates according to some predefined camera switching rules.

That is, programmable logic assembly 110 ensures that once a camera is selected, in the previously described manner, it remains selected until the associated camera microphones provide no signal output for approximately five seconds. If none of the microphones 40–52 have a signal output, representing received audio signals, assembly 110 causes a predefined one of the cameras 28–36 to become selected. In this manner, consistent "default" images are recorded, usually of the judge, thus further preventing "scattered" or random camera switching. Moreover, n order to facilitate fast switching, assembly 110 provides for only an approximate 2/10 second delay in switching thereby reducing lost images of events.

Additionally, Applicant has found that the microphones 40–52 tend to generate signals as a result of noise generated from the visitors gallery 26. Such noise is especially troublesome when the galley is full. Such noise causes the cameras 28–36 to be undesirably switched to the gallery, thereby losing valuable information of events occurring elsewhere in courtroom 12.

To counteract this "gallery noise effect", microphone 54 is placed within gallery 26 (as shown in FIG. 1). The output of microphone 54 is input to mixer 106 but is prevented form being mixed by assembly 110. Particularly, assembly 110, by means of bus 112 and typical mixer outputs, senses the presence of an output signal emanating from microphone 54. If this signal is present, assembly 110 will allow only the currently selected cameras 28–36, to remain selected, thereby preventing camera switching. When the output of microphone 54 becomes low, the currently selected camera is "released" and allowed to switch or become selected. In this manner, important events are not "missed" (i.e. failed to be recorded) due to gallery noise. Moreover, a judge may override this feature by selecting any of the currently unselected cameras in the manner previously described, thereby adding to the operational flexibility of the system. Moreover, microphone 54 may be deactivated by use of switch 104.

As further shown in FIG. 2, system 38 includes an encoder 132 which is adapted to generate typical audio signals onto bus 134. Such audio signals are typically in the range of 50 hertz–100 kilohertz and are capable of being audibly received by a user of system 38. Moreover, system 38 further includes an equalizer 136, which in the preferred embodiment of this invention comprises a one octave equalizer with conventional tone shaping, and, more particularly, comprises a model DJ-4107, manufactured by the IRP Company of Elk Grove, Ill. As should be realized by one of ordinary skill in the art, equalizer 136 is effective to improve the overall quality of the mixed microphone audio signal output, appearing on bus 108. As further shown, system 38 also includes a typical automatic gain controller 138, having an input coupled to the output of equalizer 136. In the preferred embodiment of this invention, automatic gain controller 138 comprises a model DJ-4109 manufactured by the IRP Company of Elk Grove, Ill. As should be apparent to one of ordinary skill in the art, automatic gain controller 138 is effective to provide a substantially constant electrical gain to the signals output from equalizer 136 and is effective to improve the overall audio quality associated with the output signals of microphones 40–52. The audio output signals emanating from controller 138 are then output onto bus 140.

As further shown in FIG. 2, control system 38 includes an audio distribution amplifier 142, having an input coupled to bus 140 and outputs coupled to each of the video cassette recorders 118, 120, 122, 124, and 126. In the preferred embodiment of this invention, distribution amplifier 138 comprises a Videotek model ADA-16 and is effective, as should be known to one of ordinary skill in the art, to selectively distribute the mixed audio signal appearing on bus 140 to each of the video cassette recorders 118–126. Moreover, audio distribution amplifier 142 is further coupled to a typical decoder 144 which is adapted to receive the encoded signals generated by encoder 132 and to provide a decoded output 146. In this manner, it should be realized by one of ordinary skill in the art, that encoder 132 and decoder 144 cooperate to insure that the electrical path between microphone mixer 106 and audio distribution amplifier 142 (including equalizer 136 and automatic gain controller 138) are operationally sound. Should such a decoded output 146 fail to appear at the output of decoder 144, the user of system 38 would immediately know that there was a fault in this electrical path. In this manner, it should be apparent to one of ordinary skill in the art, that a user of system 38 is able to quickly identify various faults that may occur within system 38 and take appropriate actions to correct these faults. Moreover, it should be further apparent to one of ordinary skill in the art the similar encoder-decoder combinations may be placed within other portions of system 38 and are effective to quickly isolate faults and allow the system to quickly resume normal operation.

As further shown in FIG. 2, system 38 also includes a time date generator 148 which, in the preferred embodiment of this invention, comprises a Panasonic model WJ-810. This generator, as should be apparent to one of ordinary skill in the art, receives the selected video output signal emanating from switcher 88 and applies a time and date stamp upon this received video signal. The stamped video signal is then output on to bus 150 and is input to a video distribution amplifier 152. In the preferred embodiment of this invention, video distribution amplifier 152 comprises a Videotek model VDA-16. As should be apparent to one of ordinary skill in the art, amplifier 152 is effective to receive the stamped video signal appearing on bus 150 and to distribute the received video signal to each of the video cassette recorders 118, 120, 122, 124, and 126.

System 38 further includes two switches 154, 156 which are coupled to the programmable logic controllers 110 by means of bus 158. In operation, switches 154 and 156 cause video cassette recorders 118, 120, 122, and 124 to record the audio and video signals emanating from video cassette recorder 126 when selectively activated by a signal from the programmable logic controllers 110. The use of these switches in the operation of system 10 will be explained later in this discussion.

Moreover, and as further shown in FIG. 2, local sound reinforcement system 56 includes a switch 160 having an input coupled to the mute controller 62 and further has an input coupled to the audio distribution amplifier 142. Moreover, sound reinforcement system 56 further includes a typical amplifier 162, which is amplifiably coupled to the output of switch 160 and is adapted to provide an amplified audio output signal to speakers 164, 166, 168, 170, 172, 174, 176, and 178. It should be apparent to one of ordinary skill in the art that the mixed audio signal emanating from mixer 106 and placed on bus 108 is output from amplifier 142 along bus 180. This mixed audio signal is then input to switch 160. In the preferred embodiment of this invention, switch 160 normally allows the mixed output audio signal to be placed into amplifier 162. In this manner, an amplified audio signal is applied to each of the speakers 164–178 in order to allow those sitting within courtroom 12 to hear the audio signal associated with the events to be recorded. It should be known to those of ordinary skill in the art that mute controller 62 is effective to selectively deactivate switch 160, effective to inhibit the audio signal from being applied to amplifier 162 and impressed upon speakers 164–178. In this manner, a judge may selectively prevent any of the event audio signals from being heard within courtroom 12. One event in which such audio inhibition may be desired is a "sidebar conference" in which both attorney's may confidentially discuss matters with the judge at position 14. Moreover, such inhibition may also occur when one of the parties wishes to have a confidential discussion with his or her attorney at one of the stations 20 or 22.

It should also be apparent to one of ordinary skill in the art, that local controller 60, according to the teachings of the preferred embodiment of this invention, is adapted to allow a judge or other court official to control system 38 in a relatively easy manner. In this way, system 10 is adapted to gain wide acceptance by the judiciary and become a useful court tool.

Figure 3:
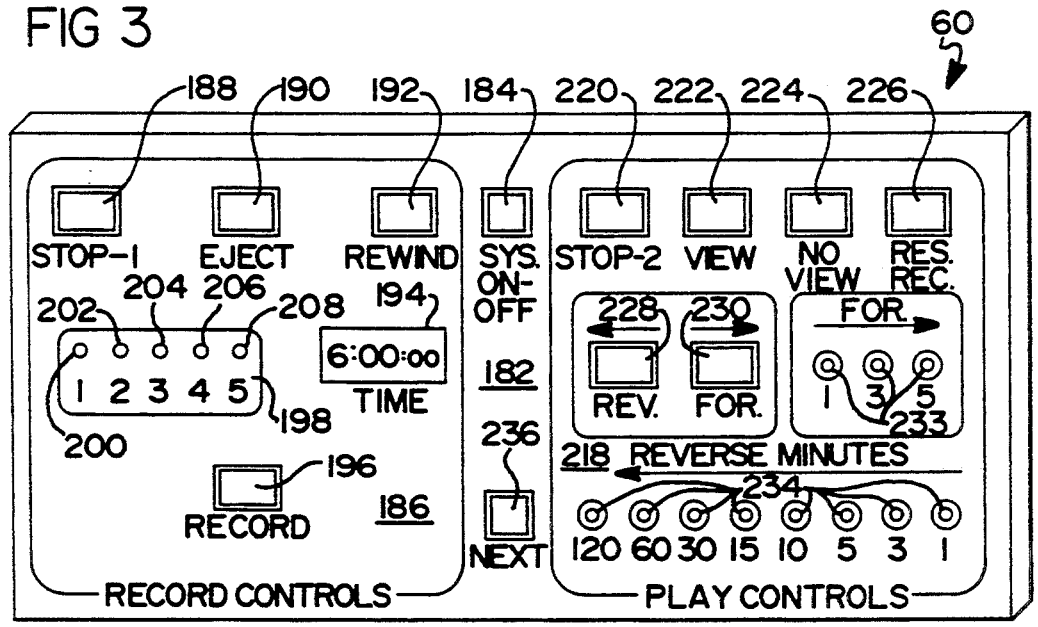
FIG. 3 is a partial perspective view of the front face of the local controller shown in FIG. 1.
Figure 4:
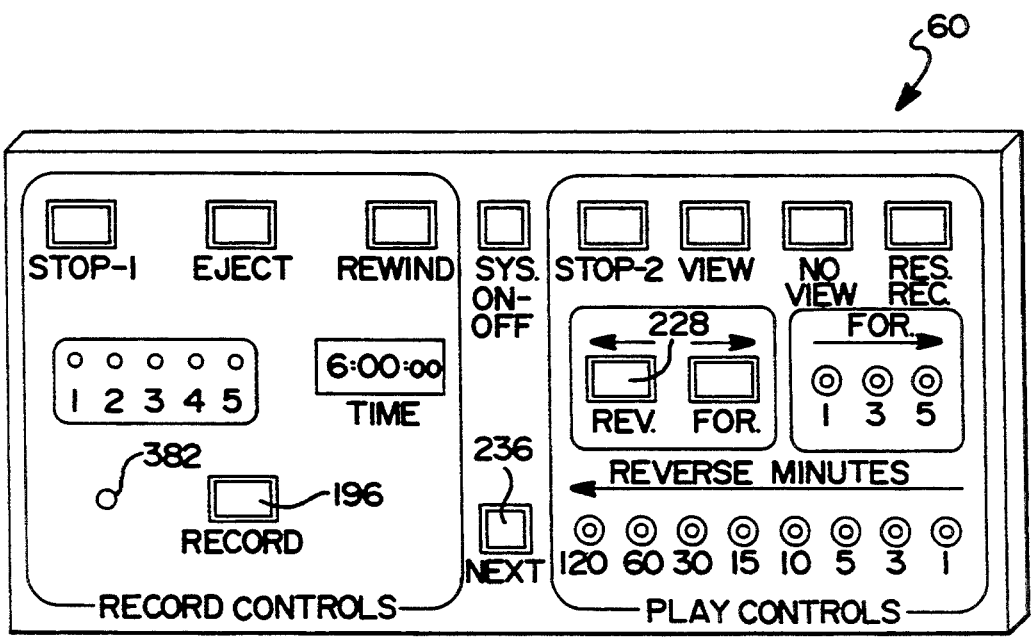
FIG. 4 is a view similar to FIG. 3 but showing a number of blinking lighted switches.

To fully understand the use of local controller 60 with control system 38, reference is now made to FIGS. 3 and 4 in which the front panel portion of local controller 60 is shown in partial prospective view. As shown, local controller 60 includes a main face portion 182 having several depressible and selectively lighted buttons or switches deployed thereon. Included within these provided switches is a system "on-off" switch 184 which is effective to render system 38 inoperable or, alternatively, to allow system 38 to be operationally coupled to a source of electrical power (not shown). Moreover, face portion 182 includes a second record portion 186 having a "stop-1" switch 188, an "eject" switch 190, a "rewind" switch 192, a time display 194, a "record" switch 196, and a "tape status" portion 198, having light emitting diodes 200, 202, 204, 206, and 208. In the preferred embodiment of this invention, each of the switches 188, 190, 192, and 196 are designed to be selectively depressible and lighted or blinking in a matter to be discussed.

Figure 13:
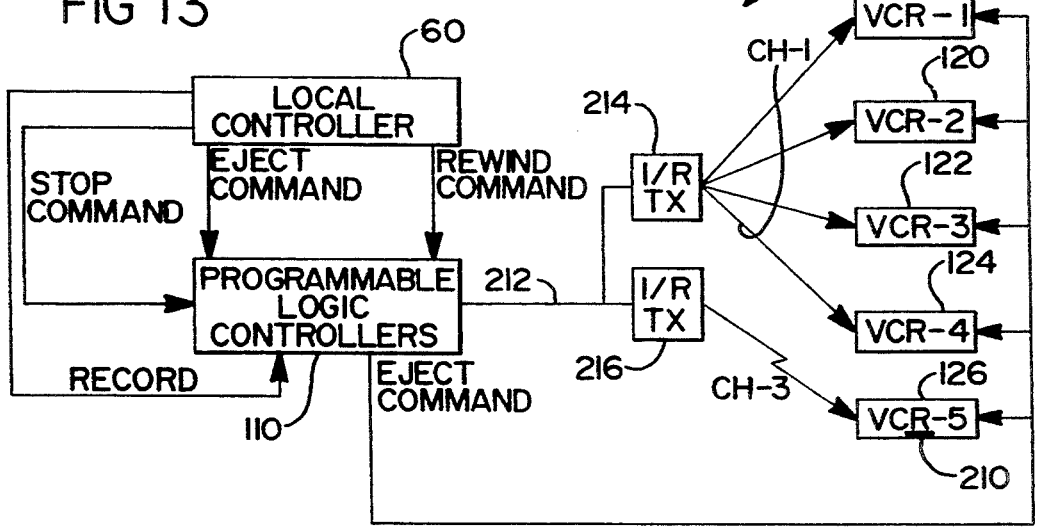
FIG. 13 is a block diagram of a portion of the audio-video system of the preferred embodiment of this invention.

To understand how local controller 60 performs these operational commands upon video cassette recorders 118, 120, 122, 124, and 126 reference is now made to FIG. 13 in which a portion of system 38 is shown, comprising local controller 60 programmable logic controller assembly 110 and video cassette recorders 118-126. As shown, local controller 60 generates "record", "stop", "eject", and "rewind" commands after respective buttons 196, 188, 190, and 192 are depressed by a user of system 38. Accordingly, these commands are received by programmable logic controller assembly 110. If an "eject" command is received, programmable logic controller assembly 110 generate a signal upon bus 128 which is received by each of the video cassette recorders 118-126. Upon receipt of this "eject" command, video cassette recorders 118-126 each eject the recording tape that currently resides within the associated and conventional tape deck. As should be realized by one of ordinary skill in the art, these tapes 210 are adapted to recordably receive audio and video information from amplifiers 142 and 152. Moreover, should programmable logic controller assembly 110 receive a "stop", "record", or "rewind" command, programmable logic controllers 110 generate a second signal upon bus 212 which is received by infrared transmitters 214, and 216. The use of the "stop", "eject", "rewind", and "record" commands will be discussed in the discussion concerning the operation of programmable logic controllers 110. However, it should be apparent to one of ordinary skill in the art that transmitter 214 transmits the received command on conventional channel 1 to recorders 118, 120, 122, and 124, which transmitter 216 transmits the received command on conventional channel 3 to recorder 126. In this manner, recorder 126 may be separately controlled from recorders 118-124.

As further shown in FIG. 3, local controller 60 further includes a second portion 218 which is adapted to include various depressible and lighted switches associated with the operation of video cassette recorder 126. As shown, portion 218 includes a "stop-2" switch 220, a "view" switch 222, a "no-view" switch 224, a "resume record" switch 226, a "reverse" switch 228, a "forward" switch 230, a "forward minute selection" portion 232, and a "reverse minute selection" portion 234. The use of the various switch controls included within portion 218 will be discussed as part of the general discussion concerning the software operation of programmable logic controllers 110. Lastly, as is also shown in FIG. 3, local controller 60 further includes a "next" switch 236 which is adapted to cause some of the switches 188, 190, 192, 196, 220, 222, 224, 226, 228, and 230 to selectively and lightably blink, depending upon the current operational state of the programmable logic controllers 110.

These switches which blink, denote those features which may be selected by a user of system 38 to occur next. As will be discussed, only those switches which blink may be depressed by a user and, after such depression, cause their associated operational commands to be performed. Therefore, the "next" switch 236 provides a user with a "blinking" indication of certain next allowable operational commands to be performed. It should be apparent to one of ordinary skill in the art, that the selective blinking of these switches allows a user to easily ascertain those features which would logically follow from the current operational state of system 38. Moreover, since these lights blink or prompt the user only in response to a user request, it should be further apparent to one of ordinary skill in the art, that continual switch blinking is obviated, thereby preventing the user from becoming unduly distracted with the operation of system 38 and thereby making system 38 relatively easy to use.

The use of the "next" switch 236 will be described during the description of the operational software characteristics of the programmable logic controllers 110. Examples of such "blinking switches" are shown in FIG. 4 where the "record" switch 196 and the "reverse" switch 228 are shown as blinking in response to a depression of the "next" switch 236. Lastly, it should be apparent to one of ordinary skill in the art that the switches 233 and 234 each comprise individual minute selection switches which are not adapted to be light activated or blinking, but are adapted to become associated with discrete intervals of time. The use of these switches will also be described in reference to the description of the software architecture of the programmable logic controller assembly 110. Lastly, it should be realized that in the preferred embodiment of this invention, timer 194 comprises a commercially available sunbeam manufactured timer.

Referring now to FIGS. 5, 6, and 7 there is shown a microphone stand 240 made according to the teachings of the preferred embodiment of this invention. As shown, microphone stand 240 is of a general skewed "c" shape having a relatively long planar bottom portion 242 and a relatively short planar top portion 244. Portions 242 and 244 are joined and are integral with end portion 246 which forms an acute angle 248 with respect to portion 242 and an obtuse angle 249 with respect to portion 244. As shown, stand 240 is adapted to support one of the microphones 40–54 on top portion 244. In this manner, microphones 40–54 are raised off the top surface of the table or structure that stand 240 is placed upon, thereby becoming closer to the sand source and allowing for greater sound reproductions. This raised microphone position also substantially prevents microphones 40–54 from being covered with papers or other materials which tend to "muffle" or "distort" the received sound. Moreover, the skewed or angled shape of stand 240 allows an individual to easily "bend over" stand 240 in order to get close to supported microphones 40–54 and easily allows microphone cabling 251 to be conveniently supported and mounted to portion 246. Such mounting may be achieved by use of typical "c" clips 253.

The preferred method of manufacturing stand 240 is to form a sheet 250 of plexiglass or other plastic material in the shape shown in FIG. 7, and to bend the formed sheet in the manner shown. That is, sheet 250 is made to have a substantially rectangular bottom portion 252, a second portion 254 having a decreasing width from the bottom portion (closer to member portion 252) to its top portion, and a top portion 256 which also has a decreasing width from its bottom portion (closer to portion 254) to its top. Once member 250 is formed in the manner shown in FIG. 7, the bottom portion of member 256 and top portion of member 252 are bent along the dotted lines to achieve the shape shown in FIG. 5. In this manner, stand 240 may be efficiently manufactured from a single plastic piece of material, without the need of extraneous cutting or shaping.

Referring now to FIG. 8, there is shown a cabinet 260 in which recorders 118, 120, 122, 124, and 126 are deployed along with assembly 110, mixer 106, amplifiers 142 and 152, switches 88, equalizer 136, and gain controller 138 (collectively denoted as the processing portion 261). As shown in the preferred embodiment of this invention, video cassette recorders 118, 120, 122, 124, and 126 are vertically stacked within cabinet 260 and their typical infrared control portions are in communicative relationship with typical infrared transmitters 214, and 216 in order to allow the controls shown and described with reference to FIG. 13. In a preferred embodiment of this invention, each of the video cassette recorders 118, 120, 122, 124, and 126 comprise commercially available Sony video cassette recorders. It should be realized by one of ordinary skill in the art that any similar type of commercially available video cassette recorder may be substituted by the Sony models. Moreover, the placement of processing portion 261 within cabinet 260, and in close proximity to video cassette recorders 118–126 obviates the need for extraneous cabling and allow the user of system 38 to quickly and easily service and maintain system 38. Moreover, encoder 132 and decoder 144 may additionally be placed within cabinet 260 to further allow efficient system fault detection.

Figure 9:
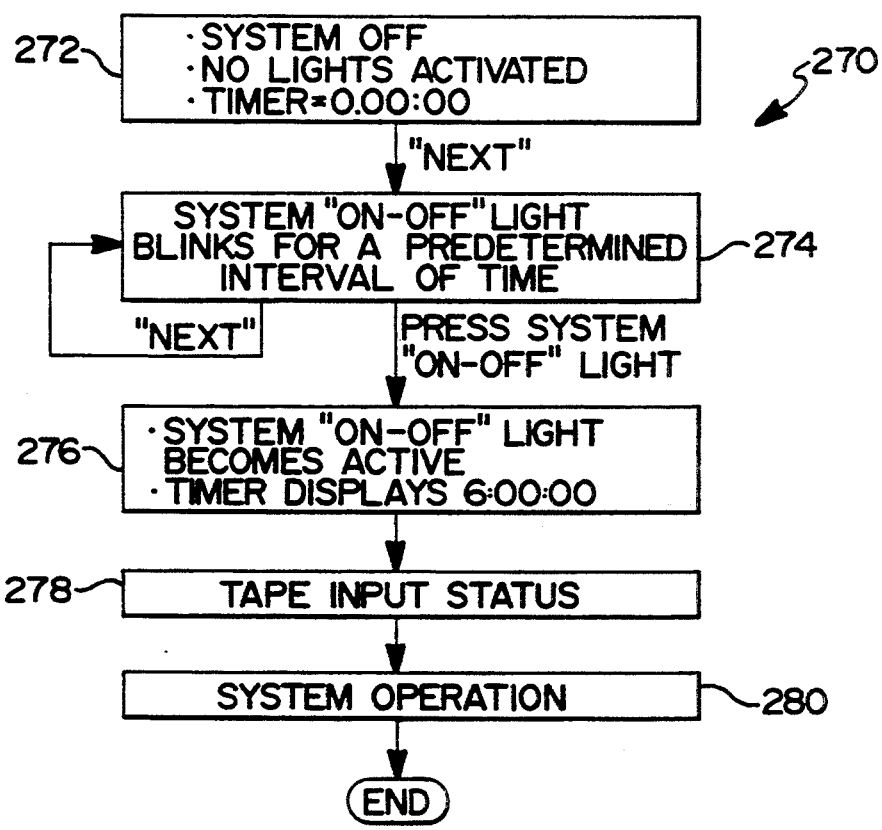
FIG. 9 is a flowchart illustrating a sequence of operational steps associated with the audio-video system of the preferred embodiment of this invention.

To fully understand the operational features of programmable logic controller assembly 110, reference is now made to flowchart 270 of FIG. 9. As shown, flowchart 270 begins with an initial step 272 in which system 38 is deactivated and switches 188, 190, 192, 196, 184, 236, 220, 222, 224, 226, 228 and 230 are deactivated and unlit. Moreover, in the initial state 272, timer 194 reads 0:00:00. Upon depression of the "next" switch 236, step 272 is followed by step 274 in which the system "on-off" switch 184 blinks for a predetermined interval of time. Once its blinking stops, the "next" switch 236 may be depressed again, and step 274 repeats. However, if the system "on-off" switch 184 is depressed, step 274 is followed by step 276 in which the system "on-off" switch becomes continuously "lit" or activated. Moreover, in step 276, timer 194 is "set" and displays a time of 6:00:00. Step 276 is then followed by step 278 in which the programmable logic controllers 110 determine the tape input status of each of the video cassette recorders 118, 120, 122, 124, and 126. This is accomplished, by a typical "tape-in" signal emanating from recorders 118, 120, 122, 124, and 126 and receivably coupled to logic controllers 110 by means of bus 128. Step 278 is then followed by step 280 in which system operation begins.

Figure 10:
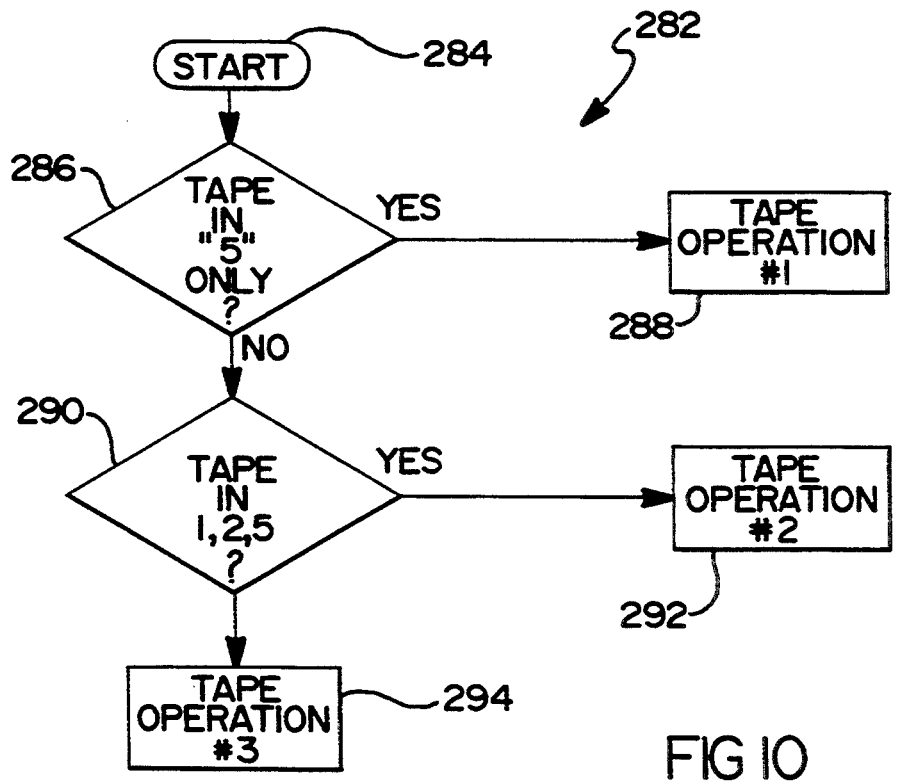
FIG. 10 is a flowchart illustrating the sequence of steps associated with the step of "tape input status" shown in the flowchart of FIG. 9.

To understand the "tape input status" step 278, reference is now made to flowchart 282 of FIG. 10. As shown, flowchart 282 begins with an initial step 284 in which the programmable logic controllers wait for receipt of a "tape input status" signal from each of the video cassette recorders 118–126. Step 284 is then followed by step 286 in which the programmable logic controllers 110 determine whether a tape is present only within the fifth video cassette recorder 126 only. If this situation occurs, step 286 is then followed by step 288 in which a "first tape operation" 288 comprises the system operation step 280.

Alternatively, step 286 is followed by step 290 in which the programmable logic controllers 110 determine whether a tape is in the first, second, and fifth video cassette recorders 118, 120, and 126. If this is logically true, programmable logic controllers 110 perform step 292 during step 280. Alternatively, step 290 is followed by step 294 in which a "third tape operation" is completed during the system operation step 280.

Figure 11A:
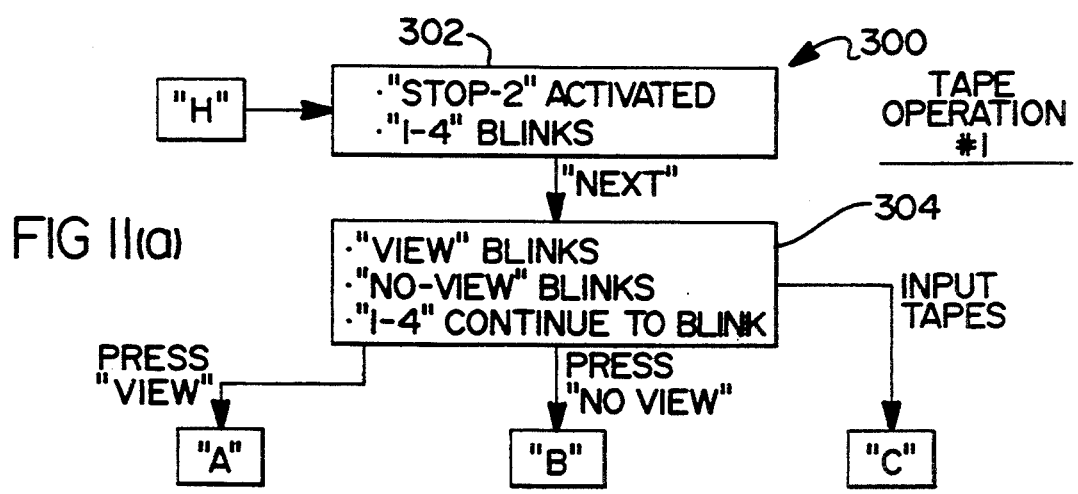
FIGS. 11(a–t) are flowcharts illustrating the sequence of steps associated with the step entitled "system operation" included within the flowchart of FIG. 9.
Figure 11B:
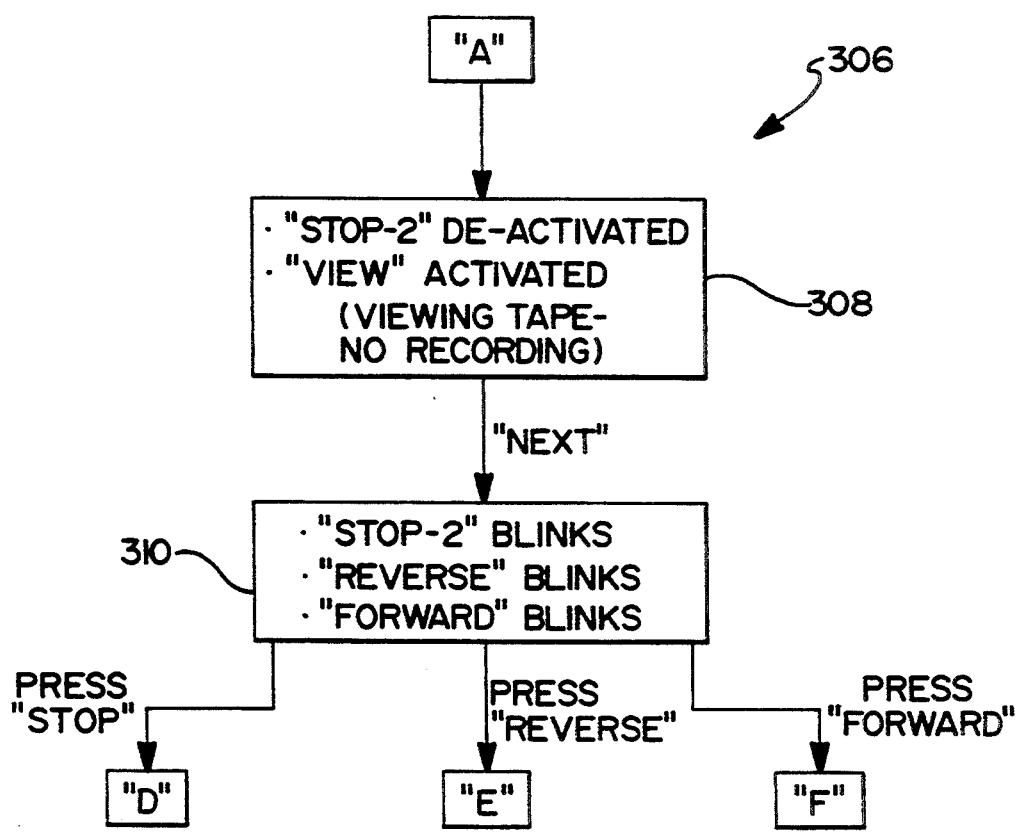

To understand the "first tape operation" step 288, reference is now made to flowchart 300 to FIG. 11(a). As shown, flowchart 300 includes an initial step 302 in which the "stop-2" switch becomes lit or activated. Moreover, lights 200, 202, 204, and 206 blink to indicate that a tape is not present within video cassette recorders 118, 120, 122, and 124. Upon depression of the "next" switch 236, step 302 is followed by step 304. In this step 304, the "view" switch 222, "no-view" switch 224, and lights 200, 202, 204, and 206 blink. In this manner, system 38 informs the user that the permissible next actions associated with system 38, are to select a view , "no-view", or "tape input" mode. To understand the operations of each of the selected modes, reference is now made to FIG. 11(b). As shown in flowchart 306 of FIG. 11(b), after the "view" switch 222 is depressed, step 304 is followed by step 308. In this step 308, the "stop-2" switch 220 becomes deactivated, the "view" switch 222 becomes activated, and audio and video information previously recorded upon the tape resident within the video cassette recorder 126 is viewed upon monitors 58 and 64. In this mode, none of the video cassette recorders, 118, 120, 122, or 124 are allowed to record any information. Upon the depression of the "next" switch 236, the "stop-2" switch 220, "reverse" switch 228 and "forward" switch 230 blink to indicate to a user that these operations are permissible. This blinking occurs in step 310. If, in step 310, the "stop-2" switch 220 is depressed, step 310 is followed by step 312 of flowchart 314, shown in FIG. 11(c).

As shown, in step 312, the "stop-2" switch 220 becomes activated, the "view" switch 222 becomes deactivated, and the tape resident within the video cassette recorder 126 stops playing. Additionally, the lights 200, 202, 204, and 206 blink to indicate to a user that tapes need to be inserted within video cassette recorders 118, 120, 122, and 124. Upon the depression of the "next" switch 236, step 312 is followed by step 316.

In step 316, the "view" switch 222 blinks, the "no-view" switch 224 and lights 200, 202, 204, and 206 continue to blink, thereby indicating to a user that tapes need to be inserted within recorders 118–124. As shown, if the "no-view" switch 222 is depressed, step 316 is then followed by step 318 in which the "stop-2" switch 222 becomes deactivated and the "no-view" switch 224 activates. If the "next" switch 236 is depressed, the "forward" switch 230 and "reverse" switch 228 each blink in step 320. If, in step 320, the "reverse" switch 228 is depressed, step 320 is followed by step 322.

In step 322, the "no-view" switch 222 remains activated, the "stop-2" switch automatically blinks to indicate to a user that the "stop-2" switch 220 must be depressed next. In this step 322, the tape resident within video cassette recorder 126 reverses in a conventional "fast" mode. Step 322 is then followed by step 324 when a user presses the "stop-2" switch 220. In step 324, the tape reversal ceases, the "reverse" switch 228 becomes deactivated, and tile "no-view" switch becomes deactivated. Step 324 is then followed by step 312.

If, in step 320 the "forward" switch 230 is depressed, step 320 is followed by step 326. In step 326, the "no-view" switch 224 remains activated, the "stop-2" switch 220 blinks to an indicate to a user that the "stop-2" switch 220 must be depressed, and the tape moves in a forward manner in a conventional fast mode. If, in step 326, the "stop-2" switch 220 is depressed, step 326 is followed by step 328.

As shown, in step 328 the tape resident within the video cassette recorder 126 stops moving forward and the "forward" switches 230 and the "no-view" switches 224 become deactivated. Step 328 is then followed by step 312.

If, in step 310, the "reverse" switch 228 is depressed, step 310 is then followed by step 330 as shown in FIG. 11(d). In step 330, the "reverse" switch 228 becomes activated or lighted, the "view" switch 222 becomes activated and the "stop-2" switch 220 blinks to indicate to a user that the depression of the "stop-2" switch 220 is the only next permissible action. If, in step 330, the "stop-2" switch 220 is depressed, step 330 is followed by step 332 in which the reverse switch 228 deactivates. Steps 324 and 332 are both followed by step 312.

If, in step 310, the "forward" switch 230 is depressed, step 310 is then followed by step 334, as shown in flowchart 336 of FIG. 11(e). As shown, in step 334, the "view" switch 222 becomes activated or lit in addition to the "forward" switch 230. Moreover, in step 334, the "stop-2" switch 220 blinks to indicate to a user that the "stop-2" switch must be depressed, upon exiting step 334. In step 334, the tape resident within video cassette recorder 126 moves forward in a conventional fast and viewed manner. Step 334 is then followed by step 336, upon depression of the "stop-2" switch 220. In step 336, the "forward switch" 230 and the "view switch" 222 become deactivated. Step 336 is followed by 312.

To understand the sequence of steps associated with the "second tape operation" step 292 of flowchart 282, reference is now made to flowchart 338 of FIG. 11(f). As shown, flowchart 338 has an initial step 340 in which the "stop-1" switch 188 becomes lit or activated. Upon depression of the "next" switch 236, the "record" switch 196 blinks, to indicate to a user that the record operation is the next and only permissible operation associated with system 10. Such blinking occurs in step 342. If the "record" switch 196 is depressed while system 10 is in operational step 342, step 346 follows.

In step 346, the "record" switch 196 becomes lit or activated, the "stop-1" switch 188 becomes deactivated, and the indicator lights 200, 202, 204, 206, and 208 become activated to indicate to a user that tapes are resident within video cassette recorders 118, 120, 122, 124, and 126. It should be apparent to one of ordinary skill in the art, that only those lights 200–208 become activated which correspond to video cassette recorders 118–126 actual having a tape resident within them. Moreover, in step 346, timer 194 begins counting down from the initial time of 6:00:00 and system 38 begins recording events occurring within courtroom 12.

Upon the depression of the "next" switch 236, step 346 is then followed by step 348 in which the "stop-1" and "stop-2" switches 188, 220 blink. If, in step 348, the "stop-1" switch 188 is depressed, step 348 is followed by step 350 of flowchart 352 of FIG. 11(g). As shown, in step 350, the "record" switch 196 becomes deactivated, the "stop-1" switch 188 becomes activated, and the timer 194 becomes deactivated or stops counting. Upon the depression of the "next" switch 236, step 350 is followed by step 352.

In step 352, the "record" switch 196, the "rewind" switch 192, and the "eject" switch 190 each blink. If, in step 352, the "record" switch 196 is depressed, step 352 is then followed by step 354. In step 354 the "record" switch 196 becomes activated, the "stop-1" switch 188 becomes deactivated, and the timer 194 begins to operate again. Moreover, the indicator lights 200–208 become activated in order to indicate a recording operation. Step 354 is then followed by step 348. If, in step 352, the "rewind" switch 192 is depressed, step 352 is then followed by step 356.

As shown, in step 356, the "rewind" switch 192 becomes activated, the "stop-1" switch 188 becomes deactivated, and all the tapes resident within video cassette recorders 118, 120, 122, 124, and 126 begin to rewind. Upon the depression of the "next" switch 236, step 356 is followed by step 358 in which the "eject" switch 190 blinks. This blinking occurs to indicate to a user of system 38 that the eject operation is only the next permissible operation that may occur within system 38.

Upon the depression of the "eject" switch 190, step 358 is then followed by step 360. Moreover, if the "eject" switch 190 is depressed in step 352, system 38 also enters step 360.

As shown, in step 360, the "eject" switch 190 is activated, the "stop-1" switch 188 becomes deactivated, the timer 194 resets to 6:00:00, and the tape indicator lights 200–208 blink. This blinking occurs to indicate to a user that all tapes resident within video recorders 118–126 have become ejected. There is no blinking that occurs during the depression of the "next" switch 236 since step 360 must be followed by step 362. In step 362, the tape indicator lights 200–208 continue to blink and a tape input is required. Step 362 is then followed by step 278 of flowchart 270 of FIG. 9.

In order to understand the "third tape operation", reference is now made to flowchart 364 of FIG. 11(h). As shown, the third tape operation 294 involves a situation in which there are no tapes present within video cassette recorders 118, 120, and 126. Therefore, flowchart 364 begins with an initial step 366 in which tapes must be loaded within cassette recorders 118–126. After such loading has occurred, step 366 is then followed by step 368 in which the programmable logic controllers 110 must determine what video cassette recorders 118–126 currently contain tapes. This is done in the previously described manner. If, in step 368, the programmable logic controllers 110 determine that there is a tape only within the video cassette recorders 126, step 368 is then followed by the first tape operation step 238 of flowchart 282. Alternatively, step 368 is then followed by step 370.

In step 370, the tape indicator lights 200–208 are deactivated and the "stop-1" switch 188 is activated or lit. Step 370 is then followed by step 372 upon depression of the "next" switch 236. In step 372, the record switch 196 blinks to indicate to a user that the only next permissible step associated with the audio-video system 38 is to record. Step 372 is then followed by step 374 of flowchart 376, shown in FIG. 11(i). As shown, in step 374, the timer 194 becomes activated and begins counting down from its initial time value, indicator lights 200–208 become activated to indicate which of the video cassette recorders 118–126 currently have a tape resident within them that is recording, the "record" switch 196 activates, and the "stop-1" switch 188 becomes deactivated. In step 374, system 38 is recording events happening within courtroom 12 in the manner previously described.

Step 374 is then followed by step 376 in which the programmable logic controllers 110 must determine whether all the channels are recording. Such determination is made by use of the conventional recording output signals associated with each of the video cassette recorders 118–126. If, in step 376, the programmable logic controllers 110 determine all channels are recording, step 376 is then followed by step 378 upon the depression of the "next" switch 236. Alternatively, step 376 is followed by step 380 in which a warning light 382 is blinked for a predetermined period of time, and in which an audio signal is output from the programmable logic controllers 110. Step 380 is then followed by step 384 in which programmable logic controllers 110 deactivate the "non-recording" video cassette recorders 118–126. Step 384 is then followed by step 386 in which the warning light 382 and the audible signals become deactivated. Alternatively, the non-recording recorder may be manually deactivated. Upon the depression of the "next" switch 236, step 386 followed by step 378.

As shown, in step 378, the "stop-1" and "stop-2" switches 188 and 220 blink for a predetermined period of time, to indicate to a user that these are the only switches that may be depressed at this interval time. If the "stop-1" switch 188 is depressed, while the programmable logic controllers 110 (i.e. the system 10) is in step 378, then 378 is followed by step 350 of flowchart 352. Alternatively, step 378 is followed by step 390.

As shown, in step 390, the "stop-2" switch 220 becomes activated or lit, the fifth light indicator 208 becomes deactivated, the "record" switch 196 remains activated and channels 1–4 are allowed to remain recording. Upon depression of the "next" switch 236, step 390 is then followed by step 392.

Figure 11J:
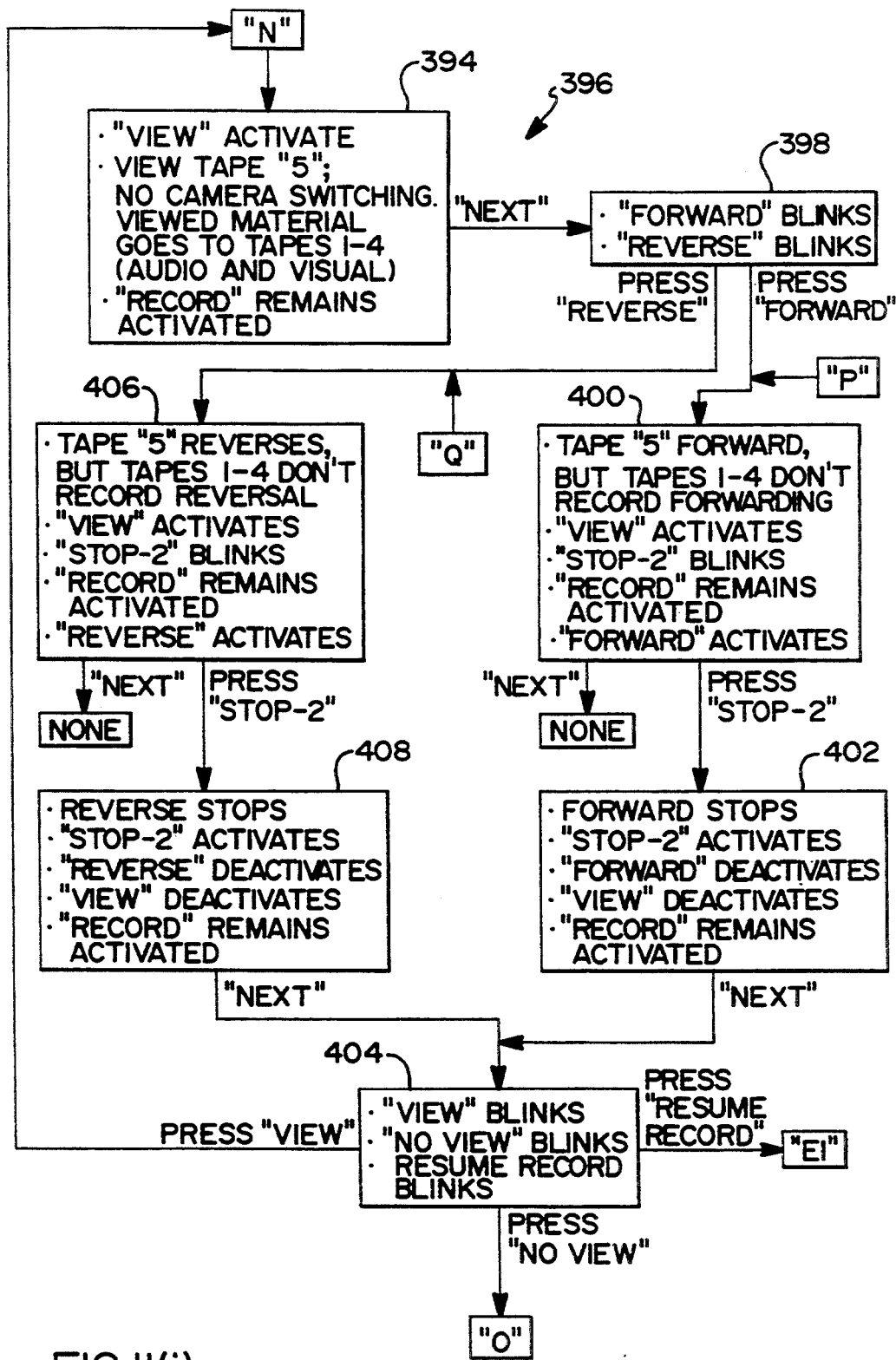

In step 392, the "view" and "no-view" switches 222 and 224 blink. Moreover, the "resume record" switch 226 also blinks. This blinking, as previously explained, indicates to a user of system 38 that these switches or operations are the only next permissible operations to be achieved. However, in contradiction to this basic operational rule, in step 394, a user of system 38 may additionally do a search without a visual indication. The use of such a search routine will be explained herein later. As shown, if the "view" switch 222 is depressed while the programmable logic controllers are in step 292, step 392 is then followed by step 394 of flowchart 396, shown in FIG. 11(j).

In step 394, the "view" switch 222 becomes activated and the "record" switch 196 remains activated. In this step, a user of system 38 may view the fifth tape resident within video cassette recorder 126 by use of monitors 58 and 64. Moreover, in this step, there is no camera switching and the viewed material automatically goes to tapes resident within video cassette records 118, 120, 122, and 124. This viewed material includes both audio and visual information and is accomplished by means of switches 154 and 156 in combination with the programmable logic controllers 110 and the video and audio distribution amplifiers 152 and 142, in a previously described manner.

If the "next" switch 236 is depressed while the programmable logic controllers are in step 394, step 394 is followed by step 398. As shown, in step 398, both the "forward" and the "reverse" switches 228 and 230 blink to indicate to a user that these are the only two permissible operations that may occur at this point in system operation. If, in step 398, the "forward" switch 230 is pressed, step 398 is followed by step 400.

As shown, in step 400, the "view" switch 222 and the "forward" switch 230 become activated. Moreover, the "record" switch 196 remains activated while the "stop-2" switch 220 blinks, to indicate to a user that the "stop-2" operation is only the next permissible operation that may occur. In this step, the fifth tape resident within the video cassette recorder 126 moves forward, but tapes resident within video cassette recorders 118, 120, 122, and 124 don't record the forwarding material. Accordingly, there is no blinking that occurs upon depression of the "next" switch 236.

After the "stop-2" switch 220 is depressed while the programmable logic controllers are in step 400, step 400 is then followed by step 402. As shown, in step 402, the forward and view switches 230 and 222 becomes deactivated while the "stop-2" switch 220 becomes activated. Moreover, the "record" switch 196 remains activated and the tape ceases to move forward. Upon depression of the "next" switch 236, step 402 is followed by step 404.

If, in step 398, the "reverse" switch 228 is depressed, step 398 is followed by step 406. As shown, in step 406, the "view switch" 222 and the "reverse" switch 228 become activated. Moreover, the "record" switch 196 remains activated while the "stop-2" switch 220 blinks. In this step, the fifth tape resident within video cassette recorder 126 reverses, but tapes resident within video recorders 118, 120, 122, and 124 and prevented from recording the reversal. Moreover, as further shown, there is no additional blinking occurs upon depression of the "next" switch 236. Accordingly, step 406 may only be exited upon depression of the "stop-2" switch 220. Upon such depression, step 406 is followed by step 408 in which the tape reversal stops while the "stop-2" switch 220 becomes activated. Moreover, in step 408, the "reverse" and view switches 228 and 222 become deactivated, while the "record" switch 196 remains activated. Upon the depression of the "next" switch 236, step 408 is followed by step 404.

Figure 11K:
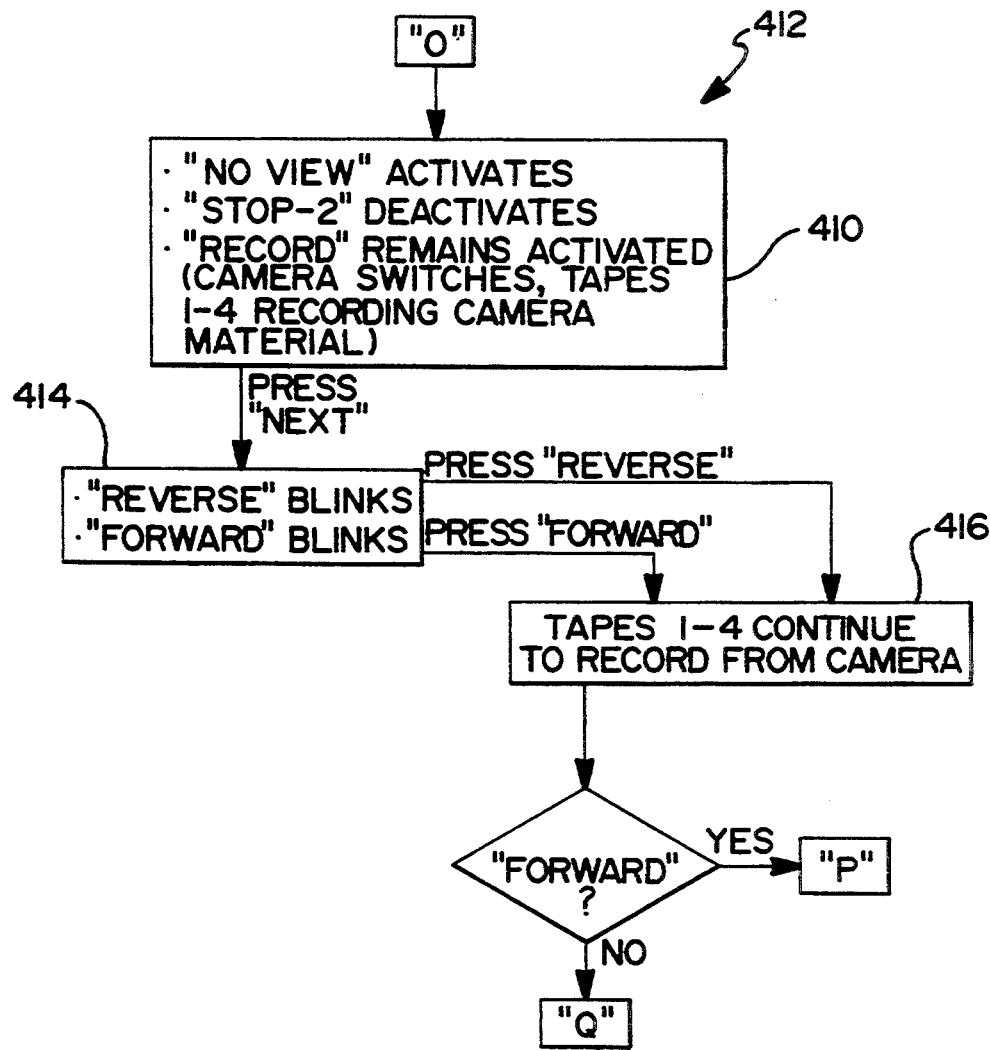

As shown, in step 404, the "view" and "no-view" switches 222 and 224 blink, and the "resume record" switch 226 also blinks. If, in step 404, the "view" switch 222 is depressed, step 404 is followed by step 394. Moreover, if the "resume record" switch 226 is depressed while the programmable logic controllers are in step 404, step 374 is made to follow step 404. However, if the "no-view" switch 224 is depressed while the programmable logic controllers remain in step 404, step 404 is then followed by step 410 of flowchart 412, shown in FIG. 11(k).

As shown, in step 410, the "no-view" switch 224 activates and the stop-2 switch 220 deactivates. Moreover, the "record" switch 196 remains activated and the cameras 28, 30, 32, 34, and 36 switch in a normal and previously described manner while tapes resident within video cassette recorders 118, 120, 122, and 124 are allowed to record camera switching material. If the "next" switch is depressed while the programmable logic controllers 110 are in step 410, step 410 is followed by step 414. In this step, the "reverse" and "forward" lights 228 and 230 blink to indicate to a user that these are the only two permissible operations that are allowed to be achieved while the programmable logic controllers are in step 410. When either of the switches 228 or 230 are depressed, while the programmable logic controllers are in step 414, step 414 is followed by step 416. As shown, in step 416 tapes resident within video cassette recorders 118-124 are allowed to record from the continually scanned or switched cameras and, if the "forward" switch 230 has been depressed, step 416 is then followed by step 400. Alternatively, step 416 is then followed by step 406.

Figure 11L:
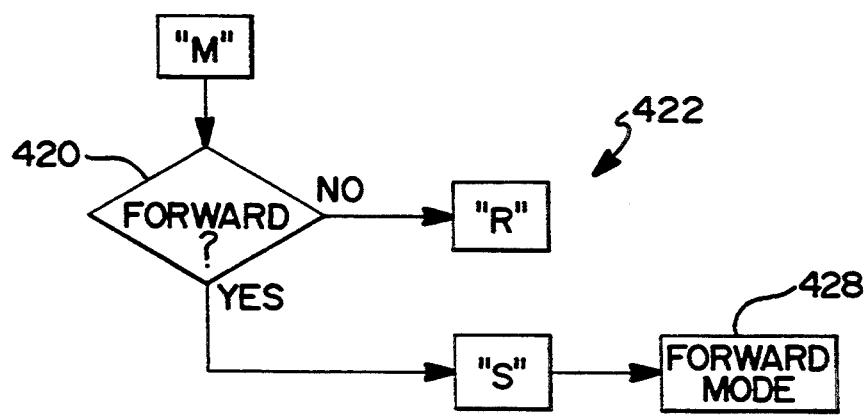
Figure 11M:
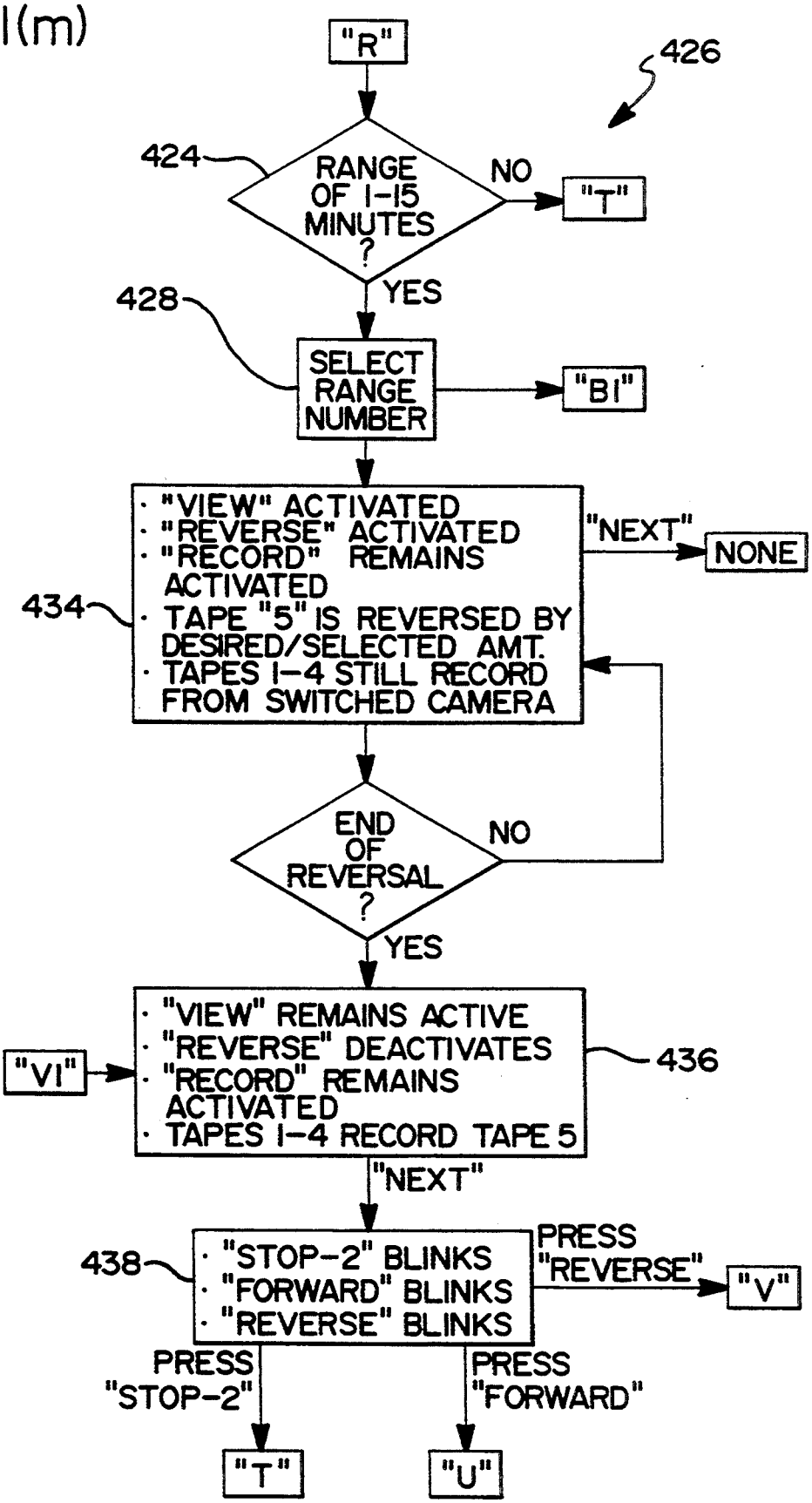

If, in step 392, a search was desired, step 392 is then followed by step 420 of flowchart 422 shown in FIG. 11(l). As shown, if in step 420, a search was desired in a forward mode, step 420 is then followed by step 424 of flowchart 426 shown in FIG. 11(m). Alternatively, step 420 is followed by step 428, denoting a forward mode. It should be noted that the "forward mode" associated with step 428 is substantially similar to the reverse mode associated with flowchart 426, except that the tape direction and associated directional indicator switches change.

As shown in flowchart 426, in step 424, a user must select a range of search minutes by use of the minute selection switches 234. If this range is within 15 minutes, step 424 is followed by step 428. Alternatively, step 424 is followed by step 430, shown in flowchart 432 of FIG. 11(n).

In step 428, a range number must be selected by a user by use of switches 234. Step 428 is then followed by step 434 in which the programmable logic controllers 110 activate the "view" and "reverse" switches 222 and 228. The "record" switch 196 remains activated and the tape resident within the video cassette recorder 126 is reversed by a desired and selected amount of time associated with the selected range number. Moreover, while such reversal is taking place, tapes resident within video cassette recorders 118–124 are allowed to record from the cameras 28–36. As the end of the reversal, step 434 is followed by step 436 in which the "view" switch 222 stays activated and the "reverse" switch 228 becomes deactivated. Moreover, the "record" switch 196 remains activated while tapes resident within video cassette recorders 118–124 begin recording the material on the tape resident within video cassette recorder 126. Upon the depression of the "next" key 236, step 436 is followed by step 438.

In step 438, the "reverse", "forward", and "stop-2" switches 228, 230, 220 blink to indicate permissible operations that may occur within system 38, at this time. If the "reverse" switch 228 is depressed, step 438 is followed by step 440 of flowchart 442, shown in FIG. 11(o). If the "stop-2" switch 220 is depressed while the programmable logic controllers reside within step 438, then step 438 is followed by step 430 of flowchart 432. Alternatively, step 438 is followed by step 444 of flowchart 432.

As shown in FIG. 11(n), in step 430, the "stop-2" switch 220 becomes activated while the "record" switch 196 remains activated. Moreover, the "view" switch 222 becomes deactivated and the cameras 28–36 switch and output image signals normally. If the "next" switch 236 is depressed while the programmable logic controllers remain in step 430, step 430 is then followed by step 435. In step 435, the "view", "no-view", and "resume record" switches 222, 224, and 226 blink to indicate to a user of system 38 that these are permissible operations. Moreover, step 434 may also allow forward and reverse minute selections, associated with switches 233 and 234, to be achieved. If the "view" switch 222 is depressed while the programmable logic controllers reside within step 435, step 436 is entered. Moreover, if the "no-view" switch 222 is depressed, step 435 is followed by step 437.

In step 437, the "stop-2" switch 220 becomes deactivated while the record switch remains activated. In this step, cameras 28–36 switch and generate image signals normally. Upon the depression of the "next" switch 236, step 437 is followed by step 439 in which the "forward" and "reverse" switches 228 and 230 blink to indicate to a user of system 38 that they are permissible operations. If the "reverse" switch 228 is depressed while the programmable logic controllers reside within step 438, step 438 is followed by step 440. Alternatively, step 438 is followed by step 444.

In step 444, the "forward" and "no-view" switches 230 and 224 are activated. The "record" switch 196 remains activated while the "stop-2" switch 220 blinks, to indicate to a user that the only permissible next step is that of depressing the "stop-2" switch. In this step, the cameras remain switching and the tape within the video cassette recorder 126 goes forward. Upon depression of the "stop-2" switch 220, step 444 is followed by step 446.

In step 446, the "forward" and "no-view" switches 230 and 224 are deactivated while the "stop-2" switch 220 activates. The "record" switch 196 remains activated and the cameras switch while the tape resident within the video cassette recorder 126 stops. Upon the depression of the "next" switch 236, step 446 is followed by step 448.

In step 448, the "view", "no-view", and "resume record" switches 222, 224, and 226 blink to indicate to a user that these are permissible next operations. If, the "view switch" 222 is depressed, step 448 is followed by step 436. If the resume record switch 226 is pressed, then step 448 is followed by step 450 of flowchart of 452 shown in FIG. 11(s). However, if the no-view switch 224 is depressed, step 448 is followed by step 436.

If the resume record switch 226 is depressed while the programmable logic controllers reside within step 435, step 435 is followed by step 450 of flowchart 452. If a forward minute selection occurs while the programmable logic controllers reside within step 435, step 435 is followed by step 460 of flowchart 462, shown in FIG. 11(q). However, if a reverse minute selection occurs while the programmable logic controllers reside within step 435, step 435 is followed by step 470 of flowchart 472, shown in FIG. 11(p).

Figure 11O:
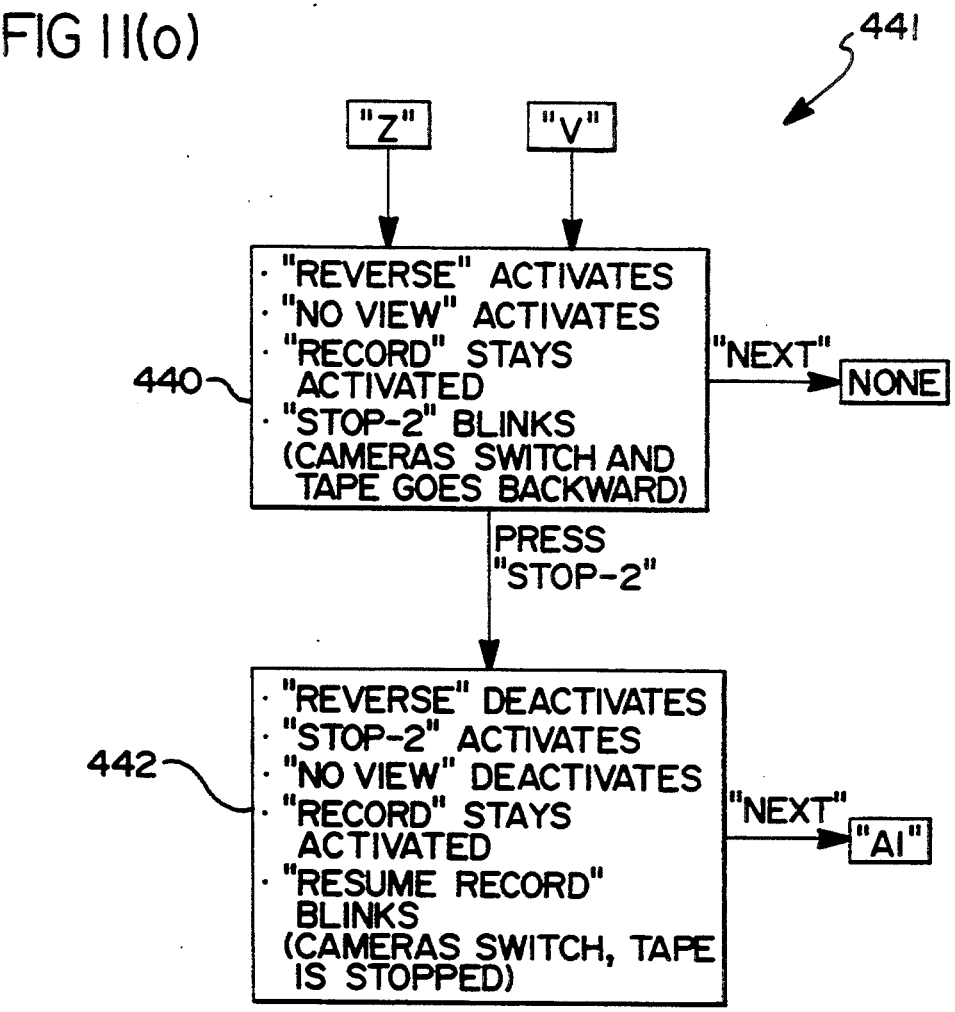

Referring now to FIG. 11(o), it is seen that in step 440, the "reverse" and "no-view", switches 228 and 224 become activated. The record switch 196 stays activated. Moreover, the "stop-2" switch 220 blinks to indicate to a user that this "stop-2" switch 220 is the only next permissible step that may occur. In this step, cameras 28-36 switch and output image signals normally and the tape resident within video cassette recorder 126 goes backward or reverses. Step 440 is then followed by step 442 after the "stop-2" switch 220 is depressed. It should be noted that upon the depression of the "next" switch 236, no addition lights blink, since the "stop-2" switch automatically blinked in step 440.

In step 442, the "reverse" and "no-view" switches 228 and 224 become deactivated. Moreover, the "stop-2" and "record" switches 222 and 196 stay activated. The "stop-2" switch 220 activates, and the cameras switch as the tape is stopped. The "resume record" switch 226 blinks. Upon the depression of the "next" switch 236, step 442 is followed by step 448 of flowchart 432, shown in FIG. 11(n).

Figure 11P:
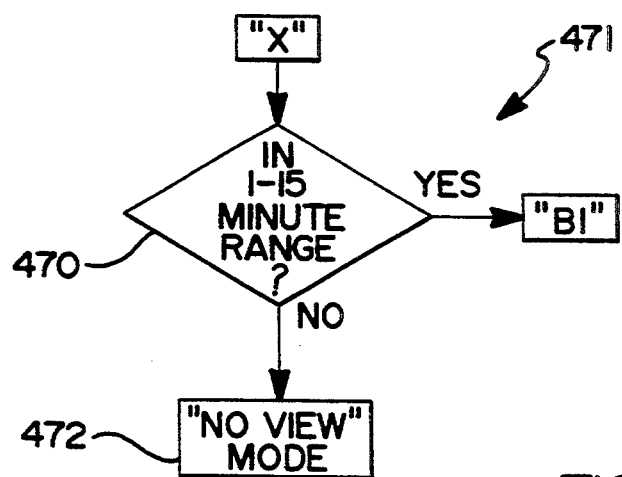

As shown in FIG. 11(p), in step 470 the programmable logic controllers 110 determine whether the minute selection made by a user is within the one-fifteen minute range. If this selected minute range is within this interval, step 470 is followed by step 428, of flowchart 426. Alternatively, step 470 is followed by step 474 in which steps 432-438 occur in the "no-view" mode.

Referring now to flowchart 462, shown in FIG. 11(q), it is seen that in step 460, a forward minute selection is made by the depression of one of the switches 233. After one selection minute button or switch has been depressed, the "view" and "forward" switches 222 and 230 become activated. The record switch 196 remains active. Moreover, the "stop-2" switch 220 becomes deactivated and the tape resident within video cassette recorder 126 goes forward in a conventional fast view mode. In this step, there is no taping by the other tapes resident within video cassette recorders 118-124 and after a predetermined period of time the tape within the video cassette recorder 126 stops and the view mode is entered. Upon entering of the view mode, tapes 1-4 record from the tape resident within video cassette recorder 126.

Upon depression of the "next" switch 236, step 460 is followed by step 462. In this step, the "stop-2", "forward", and "reverse" switches 220, 228, and 230 blink, to indicate to a user that these are the next permissible steps and the record switch 196 remains activated. If the "reverse" switch 228 is depressed, step 462 is followed by step 500 of flowchart 502, shown in FIG. 11(r). If the "forward" switch 230 is depressed, step 462 is followed by step 464. Alternatively, if the "stop-2" switch 220 is depressed, step 462 is followed by step 466.

In step 464, the "forward", "view", and "record" switches 230, 222, and 196 become activated. The "stop-2" switch 220 blinks to indicate to a user that the "stop-2" switch must be depressed as the next action within system 38. Moreover, the cameras 28-36 switch in a normal manner and tapes resident within video cassette recorders 118-124 record. Step 464 is followed by step 466 in which the "forward", "view", and "record" switches 230, 222, and 196 become deactivated while the cameras switch normally. Upon the depression of the "next" switch 236, step 466 is followed by step 468 in which the "view", "no-view", and "resume record" switches 224, 222, and 226 blink. Upon the depression of the "view" switch 222, step 468 is followed by step 436. Upon the depression of the "no-view" switch 224, step 468 is followed by step 436. Upon the depression of the "resume record" switch 226, step 468 is followed by step 450.

Figure 11R:
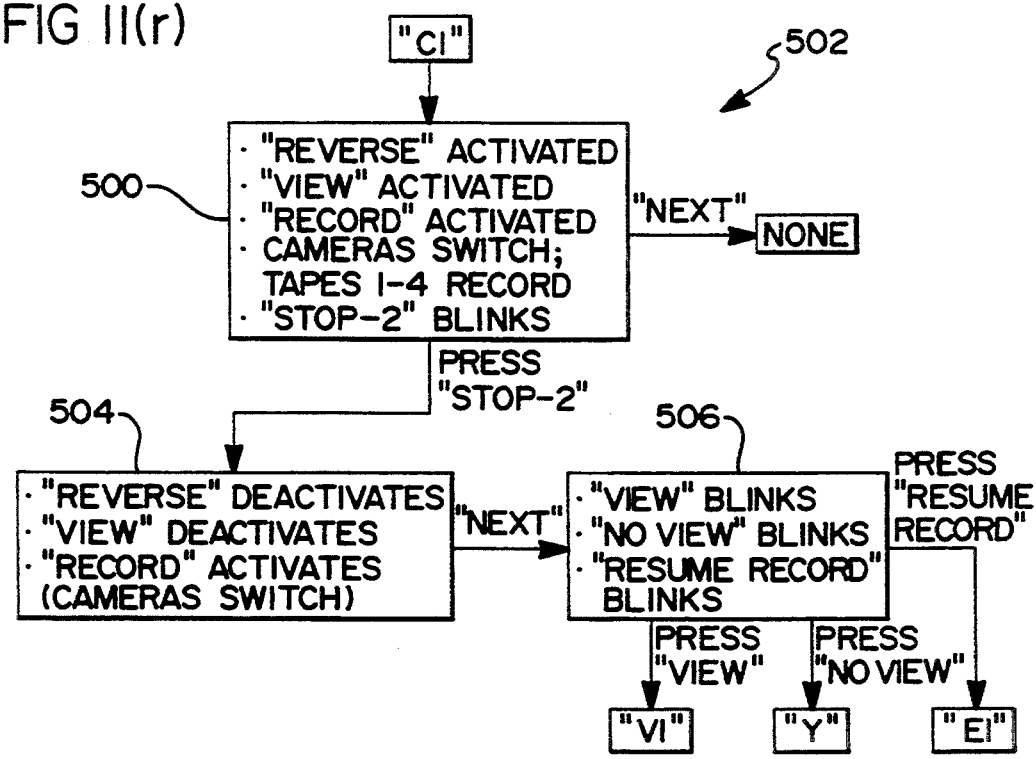

Referring now to FIG. 11(r) it is seen that in step 500, the "reverse", "view" and "record" switches 228, 222, and 196 become activated. Moreover, the "stop-2" switch 220 blinks to indicate to a user that the "stop-2" operation is the next and only permissible step to be taken. In this step 500, the cameras 28-36 continue to normally switch and provide image video output information while tapes resident within video cassette recorders 118-124 continue to record. Upon depression of the "next" switch 236, step 500 is followed by step 504.

In step 504, the "reverse" and "view" switches 228 and 222 become deactivated. The "record" switch 196 becomes activated and the cameras continue to switch and provide video output data in the normal manner. Upon the depression of the "next" switch 236, step 504 is followed by step 506. In step 506, the "view", "no-view", and "resume" record switches 222, 224, and 226 blink to indicate to a user that these are the only permissible operations to be achieved. If the "resume" record switch 226 is depressed, switch step 506 is followed by step 450. If the "no view" switch 224 is depressed, step 506 is followed by step 436. If the "no view" switch 222 is depressed, step 506 is followed by step 436.

Figure 11S:
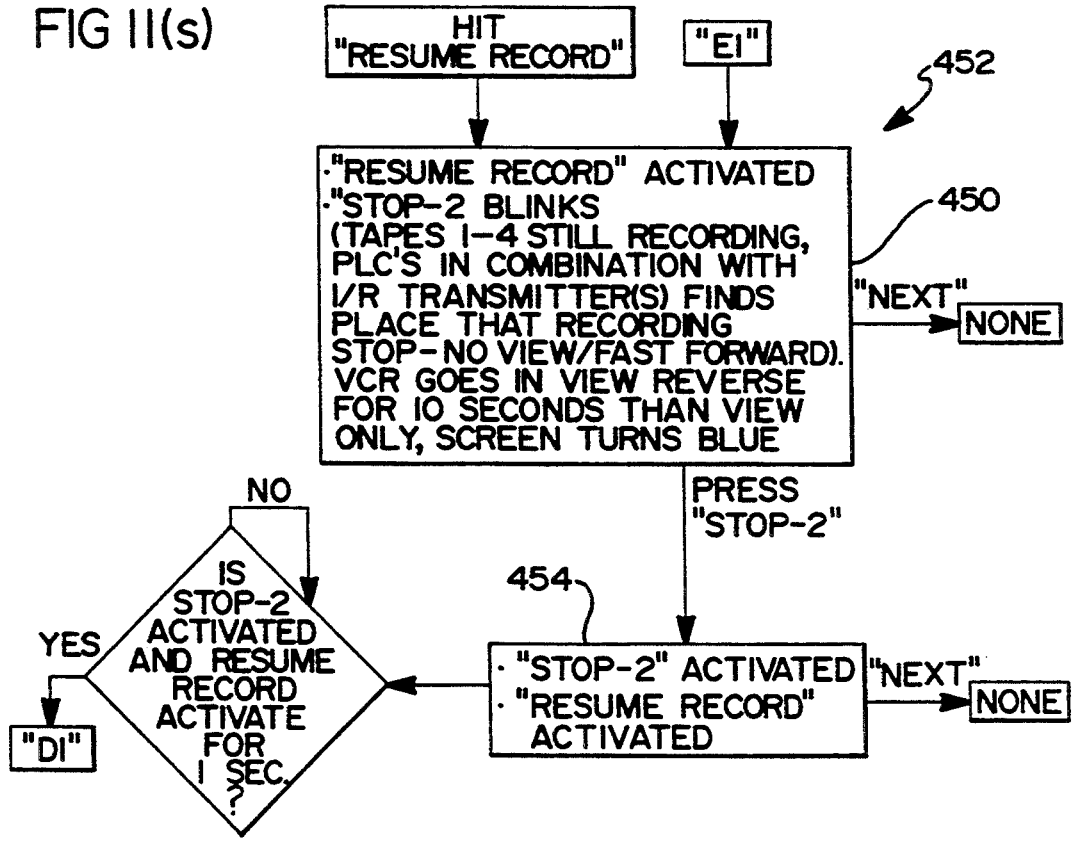

Referring now to flowchart 452, shown in FIG. 11(s), it is seen that any time the "resume" record switch 226 is depressed, step 450 is entered into. Moreover, in step 450, the "resume record" switch 226 becomes activated while the "stop-2" switch blinks. There is no additional blinking that is occurs after the depression of the next switch 236 since the blinking of the "stop-2" switch informs the user that this operation is tile only next permissible operation to occur. Moreover, in step 450, tapes resident within video recorders 118-124 continue to record and the programmable logic controllers in combination with the infrared transmitters 214, 216 find the place on a tape where the recording stop. This is in a no-view and a conventional fast 11 forward mode.

Figure 11T:
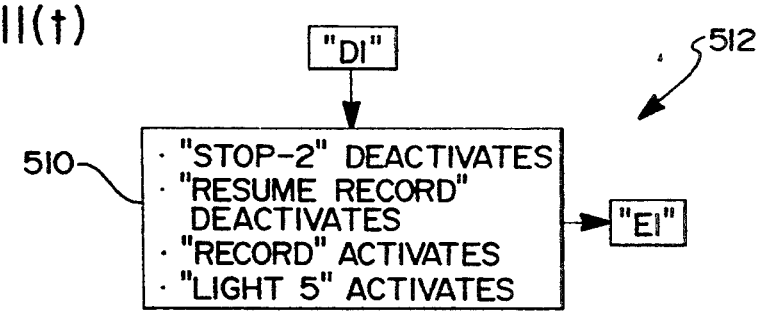

After this has occurred, the video cassette recorder 126 goes in a view reverse mode for approximately 10 seconds and then in a view only mode. In this manner, the screen on monitors 58 and 64 turns blue to indicate to a user that a resume record key switch has been hit. Upon depression of the "stop-2" switch 220, step 450 is followed by step 454. Step 454, the "stop-2" switch 220 is activated while the "resume record" switch 226 remains activated. If both of these switches 220 and 226 are activated for approximately 1 second, step 4.54 is followed by step 510 of flowchart 512, shown in FIG. 11(t). In step 510, the "stop-2" and "resume record" switches 220 and 226 become deactivated while the record switch 196 becomes activated. Moreover, light 208 becomes activated. Step 510 is followed by step 450.

Figure 12:
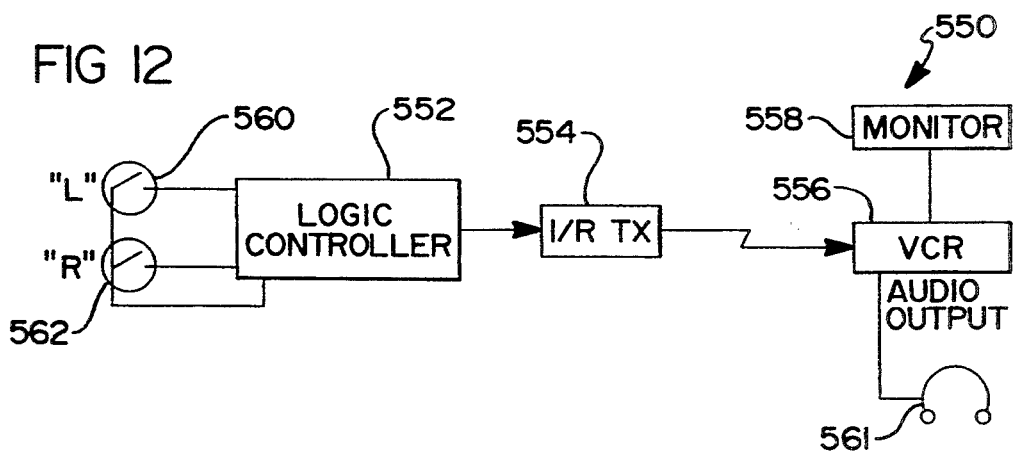
FIG. 12 is a block diagram of a transcriber station made in accordance with the teachings of the preferred embodiment of this invention.

In the foregoing manner, it should be apparent to one of ordinary skill in the art that system 38 provides a user with a judicial audio-video system which is adapted for use within a courtroom and which is relatively easy to use. Moreover, and as an additional feature of the system, reference is now made to FIG. 12 in which a transcriber station 550 is shown. As shown, transcriber station 550 includes a programmable logic controller 552 which has an output coupled to a typical infrared transmitter 545. Infrared transmitter 554 is communicatively coupled to a typical video cassette recorder 556, having a first audio and visual output to monitor 558 having a visual output coupled to monitor 558 and an audio output coupled to a headset 560. Moreover, logic controller 552 has an input coupled to a pair of left and right switches 560, 562, which send commands to logic controller 552 in order to control the audio and video output of the video cassette recorder 556. Specifically, if the right switch 562 is depressed twice, the tape resident within the video cassette recorder 556 goes back a preselected amount of time at a relatively fast rate of speed. If the right switch 562 is depressed once, the tape is played within the video cassette recorder 556 in a normal manner. If the locked switch 560 is depressed, the tape resident within video cassette recorder 556 is reversed until the switch 560 is depressed. In this manner, someone may take one of the tapes, recorded by recorders 118–126, and easily transcribe this to a written record.

It is to the advantage of this invention is not limited to the exact construction or method illustrated and described above, but that various changes and modifications may be made without departing from the spirit and scope of the invention as defined in the following subjoined claims. Moreover, it should further be realized that any number of cameras or microphones may be used within this system, depending upon the system operational need.

I claim:

1. An audio and video recording system comprising:
a plurality of microphones adapted to generate certain audio signals;
a plurality of cameras adapted to generate certain video signals;
a plurality of recorders, coupled to said plurality of microphones and to said plurality of cameras, said plurality of recorders being adapted to receivably record said certain audio and video signals;
control means, coupled to said plurality of recorders for defining actions including selectively rewinding a first of said plurality of recorders, selectively preventing said first of said plurality of recorders from receiving said audio and video signals and selectively causing audio and video signals that have been previously recorded by said first of said plurality of recorders to be recorded by said second of said plurality of recorders, and for allowing only certain of said defined actions to occur at a predetermined time, said control means further including
a plurality of lighted and depressible switches,
said control means further being adapted to uniquely associate each of said defined actions with at least one of said plurality of lighted and depressible switches and said control means further comprising,
means for indicating which of said lighted and depressible switches represent at least one valid, defined action, said indicating means including
a depressible, next switch which when depressed causes to blink those lighted and depressible switches which, if selected next, represent said at least one valid, defined action,
said control means being further adapted to perform one of said valid, defined actions, said one of said valid, defined actions being selected by depressing one of said blinking lighted and depressible switches.

2. The audio and video recording system of claim 1, further comprising time and date generation means, coupled to said plurality of video recorders, for recordably placing a time and a date upon each of said audio and video signals.

3. The audio and video recording system of claim 1 further comprising at least one monitor coupled to said plurality of video recorders, said at least one monitor being adapted to display said recorded events.

4. The audio and visual recording system of claim 1 further comprising mute means, coupled to each of said plurality of cameras and to each of said plurality of microphones for selectively preventing at least one of said microphones and at least one of said cameras from generating said respective first and second signals.

5. The audio and visual recording system of claim 1 further comprising encoder and decoder means for ascertaining faults within said audio and video system.

6. The audio and visual recording system of claim 1 further comprising a plurality of speakers adapted to receive said certain audio signals and to generate sounds that are substantially similar to said received certain audio signals.

* * * * *